(12) United States Patent
Bates et al.

(10) Patent No.: US 9,494,976 B2
(45) Date of Patent: Nov. 15, 2016

(54) PROTECTIVE COVER FOR A TABLET COMPUTER

(71) Applicant: Logitech Europe S.A., Morges (CH)

(72) Inventors: Mathew Bates, Deansgrange (IE);
Brian Stephens, Glenageary (IE); John Moriarty, San Francisco, CA (US);
Simone Mandelli, La Conversion (CH);
James Jackson, North Vancouver (CA);
James Lynch, Cabinteely (IE); Ronan Carroll, Morges (CH); Mel Reynolds, Bray (IE);
(Continued)

(73) Assignee: Logitech Europe S.A., Lausanne (CH)

( * ) Notice: Subject to any disclaimer, the term of this patent is extended or adjusted under 35 U.S.C. 154(b) by 0 days.

(21) Appl. No.: 13/854,027

(22) Filed: Mar. 29, 2013

(65) Prior Publication Data

US 2014/0071605 A1    Mar. 13, 2014

Related U.S. Application Data

(60) Provisional application No. 61/699,856, filed on Sep. 11, 2012, provisional application No. 61/800,850, filed on Mar. 15, 2013.

(51) Int. Cl.
*G06F 1/16*    (2006.01)
*B23P 19/00*    (2006.01)
(Continued)

(52) U.S. Cl.
CPC ............. *G06F 1/1632* (2013.01); *B23P 19/00* (2013.01); *G06F 1/162* (2013.01); *G06F 1/1628* (2013.01);
(Continued)

(58) Field of Classification Search
CPC .................... G06F 1/1616; G06F 1/166; G06F 2200/1633; G06F 1/1654; G06F 1/162;
(Continued)

(56) References Cited

U.S. PATENT DOCUMENTS 6,700,775 B1    3/2004 Chuang et al.
8,724,302 B2 *  5/2014 Whitt et al. ............. 361/679.09
(Continued)

FOREIGN PATENT DOCUMENTS

JP    2008-233985 A    10/2008
JP    2012-043182 A    3/2012

*Primary Examiner* — Ernest Unelus
(74) *Attorney, Agent, or Firm* — Kilpatrick Townsend & Stockton LLP

(57) ABSTRACT

Aspects of the invention relate to an apparatus including a housing and a slot disposed in the housing, the slot configured to hold an input device in a plurality of upright configurations including at least a forward-facing upright configuration such that the input device faces the front portion of the housing, and at least a backward-facing upright configuration such that the input device faces the back portion of the housing. The slot can be overmolded with a rubber compound (e.g. silicon-based) and configured to provide an improved coefficient of friction to reduce slippage of the input device when held in the slot. In some aspects, the housing includes a surface, and the overmolded portion of the slot can protrude above the surface of the housing.

25 Claims, 20 Drawing Sheets

(72) Inventors: Stephen Harvey, County Cork (IE);
Denis O'Keeffe, Newmarket (IE)

(51) Int. Cl.
*H05K 5/02* (2006.01)
*G06F 1/26* (2006.01)
*G06F 3/02* (2006.01)

(52) U.S. Cl.
CPC ........... *G06F 1/1654* (2013.01); *G06F 1/1662* (2013.01); *G06F 1/1669* (2013.01); *G06F 1/26* (2013.01); *G06F 3/02* (2013.01); *G06F 3/0202* (2013.01); *H05K 5/02* (2013.01); *Y10T 29/49826* (2015.01)

(58) Field of Classification Search
CPC .................. G06F 1/1669; G06F 1/1632; G06F 1/1667; G06F 1/1628; A47B 23/043
USPC ............................. 361/679.09, 679.17, 679.2
See application file for complete search history.

(56) References Cited

U.S. PATENT DOCUMENTS

| | | |
|---|---|---|
| 2006/0007645 A1 | 1/2006 | Chen et al. |
| 2006/0018089 A1 | 1/2006 | Chou |
| 2006/0227111 A1 | 10/2006 | Chou |
| 2011/0292584 A1* | 12/2011 | Hung .................... G06F 1/1632 361/679.26 |
| 2012/0008269 A1 | 1/2012 | Gengler |
| 2012/0044638 A1 | 2/2012 | Mongan et al. |
| 2012/0057288 A1 | 3/2012 | Chou et al. |
| 2012/0243149 A1* | 9/2012 | Gartrell et al. .......... 361/679.01 |
| 2013/0088431 A1* | 4/2013 | Ballagas et al. .............. 345/168 |
| 2013/0279100 A1* | 10/2013 | Fontana et al. ............ 361/679.2 |

* cited by examiner

PROTECTIVE COVER FOR A TABLET COMPUTER

CROSS-REFERENCES TO RELATED APPLICATIONS

The present non-provisional application claims benefit under 35 U.S.C. §120 of U.S. Provisional Patent Application No. 61/699,856, filed on Sep. 11, 2012, and entitled "Protective Cover for a Mobile Input Device," and U.S. Provisional Patent Application No. 61/800,850, filed on Mar. 15, 2013, and entitled "Protective Cover for a Tablet," both of which are incorporated by reference in their entirety for all purposes.

The following non-provisional U.S. patent applications (including this one) are being filed concurrently, and the entire disclosure of the other applications are incorporated by reference into this application in their entirety for all purposes:

Application No. 13/854,010, filed Mar. 29, 2013; and
Application No. 13/854,016, filed Mar. 29, 2013;
Application No. 13/854,013, filed Mar. 29, 2013.

BACKGROUND

Tablet computers are increasingly being used by consumers due to their portability and ease of use. However, the portability of the tablet computer introduces some disadvantages as it may not provide all the functionality of a more robust computing device, such as a laptop. For example, performing word processing on a touch-screen keyboard may be cumbersome and less efficient. Consumers desiring the word processing functionality of a laptop may choose to attach a physical keyboard to their tablet computer. Other consumers may desire using their tablet computer for media purposes, such as playing games or viewing movies. Some consumers may not use their tablet computer for a single purpose, but may use it for word processing, media purposes, and for a variety of other uses.

Accordingly, what is desired are improved methods and devices for solving some of the problems discussed above, while reducing at least some of the drawbacks described above.

BRIEF SUMMARY

In certain embodiments, a protective cover includes a housing with a front portion and a back portion, a plurality of keys disposed in the front portion of the housing, and a slot disposed in the housing and above the plurality of keys. In some cases, the slot spans a width of the housing and is configured to hold an input device in a plurality of upright configurations. Some upright configurations can include at least a forward-facing upright configuration such that the input device faces the front portion of the housing, and at least a backward-facing upright configuration such that the input device faces the back portion of the housing.

In some embodiments, the slot can be overmolded with a rubber compound to provide an improved coefficient of friction to reduce lateral slippage of the input device when held in the slot. The housing can include a surface where the overmolded portion of the slot can protrude above the surface of the housing such that it can contact a surface of the input device when the surface of the input device is configured to be opposite and adjacent to the surface of the housing. For example, the overmolding can contact a touch screen of an input device when the input device and protective cover are in a closed clamshell configuration. The rubber compound can be a silicon-based rubber compound, and the input device can be a tablet computer, mini-tablet computer, mobile phone, personal digital assistant, or the like. The slot can be configured to hold the input device at a first angle with respect to the back portion of the housing when configured in the backward-facing upright configuration. Furthermore, the slot can be configured to hold the input device at a second angle with respect to the front portion of the housing when configured in the forward-facing upright configuration. In some aspects, the first angle is different from the second angle.

In further embodiments, the slot is molded and comprised of an extruded aluminum structure with a co-molded silicon rubber disposed thereon. The slot can be configured to hold the input device in two or more forward-facing upright configurations or two or more backward-facing upright configurations. The slot can include one or more magnets disposed in or around the slot, where the magnets can improve a hold strength of the slot when the input device is configured in one of the plurality of upright configurations.

In yet further embodiments, an apparatus can include a housing with a front portion and a back portion, and a slot disposed in the housing and configured to hold an input device in a plurality of upright configurations including at least a forward-facing upright configuration such that the input device faces the front portion of the housing, and at least a backward-facing upright configuration such that the input device faces the back portion of the housing. The slot can be overmolded with a rubber compound and configured to provide an improved coefficient of friction to reduce slippage of the input device when held in the slot. In some aspects, the housing includes a surface, and the overmolded portion of the slot can protrude above the surface of the housing such that it can contact a surface of the input device when the surface of the input device is configured to be opposite and adjacent to the surface of the housing. For example, the overmolding can contact a touch screen of an input device when the input device and protective cover are in a closed clamshell configuration. The rubber compound can be a silicon-based rubber compound, and the input device can be a tablet computer, mini-tablet computer, mobile phone, personal digital assistant, or the like.

In some embodiments, the slot is configured to hold the input device at a 65 degree angle with respect to the back portion of the housing when configured in the backward-facing upright configuration. Furthermore, the slot is configured to hold the input device at a 72 degree angle with respect to the front portion of the housing when configured in the forward-facing upright configuration. The slot can be molded and comprised of an extruded aluminum structure with a co-molded silicon rubber disposed thereon.

In certain embodiments, the apparatus can further include one or more magnets disposed in or around the slot, the one or more magnets configured to provide a magnetic force operable to increase a retention strength of the slot, the retention strength being related to an amount of force required to budge or remove the input device from the slot when the input device is configured in one of the plurality of upright configurations. The magnets can provide a magnetic force of a magnitude such that the retention strength of the slot is greater than a combined weight of the apparatus and the input device. In some aspects, the retention strength of the slot can be reduced when the input device is laterally moved along the slot from the one or more upright configurations or the input device is moved a threshold angle from the one of the plurality of upright configurations.

According to some embodiments, an apparatus includes a housing with a front portion and a back portion, and a slot disposed in the housing and configured to hold an input device in an upright configuration. The slot can include one or more magnets disposed in or around the slot, the one or more magnets configured to provide a magnetic force operable to increase a retention strength of the slot, where the retention strength is related to an amount of force required to budge or remove the input device from the slot when the input device is configured in one of the plurality of upright configurations. The magnets can provide a magnetic force of a magnitude such that the retention strength of the slot is greater than a combined weight of the apparatus and the input device. On some cases, the retention strength of the slot can be reduced when the input device is laterally moved along the slot from the upright configuration or the input device is moved a threshold angle from the upright configuration.

According to further embodiments, a protective cover includes a housing with a front portion and a back portion, and a slot disposed in the housing and configured to hold an input device in a plurality of upright configurations. The slot can include a first set of features forming a first portion of the slot and configured to secure the input device in an upright and forward-facing configuration such that the input device faces the front portion of the housing. The slot can also include a second set of features forming a second portion of the slot and configured to secure the input device in an upright and backward-facing configuration such that the input device faces the back portion of the housing. The slot or a portion thereof can be overmolded with a rubber compound and configured to provide an improved coefficient of friction in the slot. In some aspects, one or more magnets can be disposed in or around the slot, the one or more magnets configured to provide a magnetic force operable to increase a retention strength of the slot. The retention strength can be related to an amount of force required to budge or remove the input device from the slot when the input device is configured in one of the plurality of upright configurations. In some cases, the magnets provide a magnetic force of a magnitude such that the retention strength of the slot is greater than a combined weight of the apparatus and the input device. The retention strength of the slot can be reduced when the input device is laterally moved along the slot from the one or more upright configurations or the input device is moved a threshold angle from the one of the plurality of upright configurations.

According to yet further embodiments, a protective cover includes a housing and a slot disposed in the housing, where the slot spans a width of the housing (e.g., the whole width or a portion thereof) and can be configured to hold an input device in an upright configuration. A portion of the slot (e.g., the whole slot or a portion thereof) can be overmolded with a rubber compound to provide an improved coefficient of friction to reduce lateral slippage of the input device when held in the slot.

DETAILED DESCRIPTION

Embodiments of the invention are directed to a protective cover for a computing device. The protective cover may include a latch configured to translate from the protective cover in a horizontal or diagonal manner. The protective cover may include a hinge with a stopper preventing over rotation of the hinge. The protective cover may include a sliding tray that allows for the computing device to engage into a slot in the protective cover in a plurality of configurations. In some embodiments, the slot is configured with a switch that when activated by a computing device contacting the switch, places the keyboard in the protective cover into a pre-defined mode of operation. The protective cover may house magnets in a plurality of locations and configurations that allow the protective cover and the computing device housed by the protective cover to be oriented in a plurality of formations. A keyboard in the protective cover may be configured with a specific layout of keys and the functionality of a series of keystrokes may be pre-defined as a specific operation or function.

Figure 1:
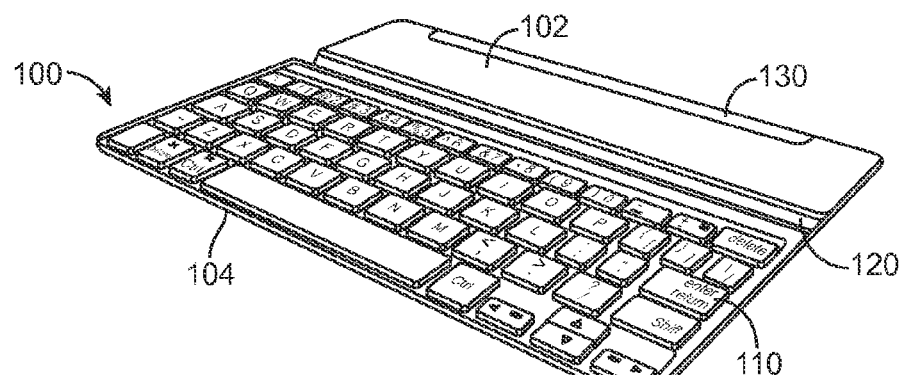
FIG. 1 depicts a perspective view of a protective cover with a latch mechanism configured to attach to a tablet computer, according to an embodiment of the invention.

FIG. 1 depicts a perspective view of a protective cover 100 with a latch mechanism 130 configured to attach to a tablet computer 105, according to an embodiment of the invention. In a closed configuration (not shown), the protective cover 100 can be configured to fit securely over a tablet computer 105 in a clam shell configuration to protect it from damage (e.g., scratches, dents, shock damage, etc.). A latch 130 is operable to move from a closed position (as shown) to an open position to attach to a portion of the tablet computer 105 (e.g., via magnet coupling, mechanical coupling, etc.) to hold and maintain and secure the clam shell configuration. In an open position, the slot 120 can hold the tablet computer 105 in a number of different upright positions to provide an optimum viewing angle for a user. The protective cover 100 can further provide a number of input features and functions including, but not limited to, an alphanumeric keyboard 110 and media buttons (not shown).

The protective cover 300 includes a top side 102 and a bottom side 104. The latch 130 is integrated in the top side 102 of the protective cover 100 and is configured to automatically pop out from a flush position (flush to the top side 102 of the protective cover 300) and attach to the tablet computer 105 when the edge of the tablet computer 105 is in close proximity to the latch 130, as shown in FIGS. 4-15. The auto-latch capabilities can be performed by magnetic means, electro-magnetic means, mechanical means, motion detection, proximity detection, or any other technology that would be appreciated by one of ordinary skill in the art with the benefit of this disclosure. For example, the protective cover 100 can be operable to detect a magnet within the tablet computer 105 and automatically open the latch 130 to affix or couple the tablet computer 105 to the protective cover 100 in the clam shell position.

Figure 2:
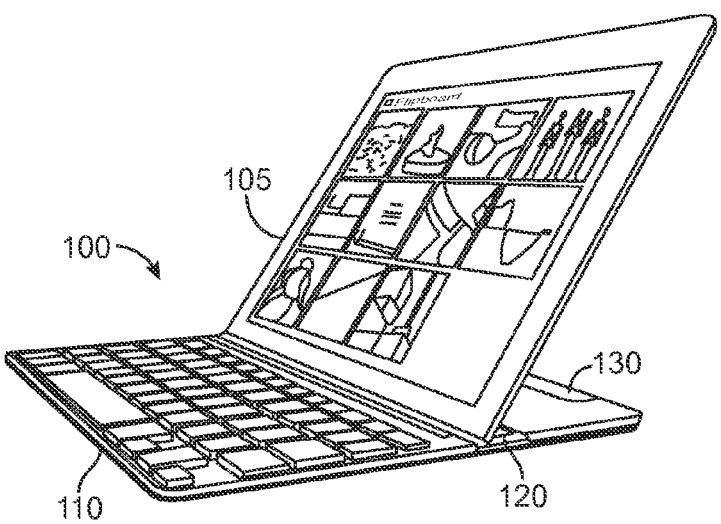
FIG. 2 depicts a perspective view of the protective cover with a tablet computer configured thereon in a first user operable configuration, according to an embodiment of the invention.

FIG. 2 depicts a perspective view of the protective cover 100 with a tablet computer 105 configured thereon in a first user operable configuration, according to an embodiment of the invention. In the first user operable configuration, the tablet computer 105 is positioned in the slot 120 such that it is held in an upright position and facing the keyboard 110 on the top side 102 of the protective cover 100. The latch 130 can be configured in the closed configuration such that the latch 130 is flush with the top side 102 of the protective cover 100 to provide an aesthetically pleasing and sleek design. Although the tablet computer 105 is shown in one viewing angle in the first user operable configuration, it should be understood that the slot 120 can be configured to hold the tablet computer 105 in a number of viewing angles when configured to face the keyboard 110 side or the latch 130 side of the protective cover 100.

Figure 3:
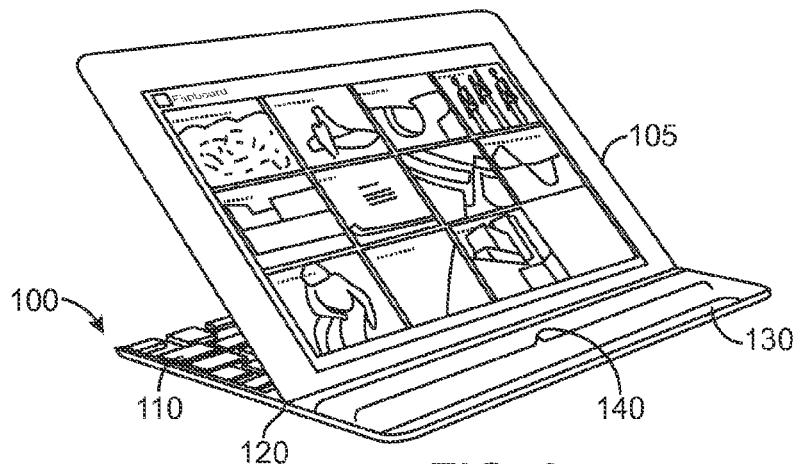
FIG. 3 depicts a perspective view of the protective cover with a tablet computer configured thereon in a second user operable configuration, according to an embodiment of the invention.

FIG. 3 depicts a perspective view of the protective cover 100 with a tablet computer 105 configured thereon in a second user operable configuration, according to an embodiment of the invention. In the second user operable configuration, tablet computer 105 is positioned in the slot 120 such that it is held in an upright position and facing latch 130 on the top side 102 of protective cover 100. Latch 130 can be configured in the closed configuration such that latch 130 is flush with the top side 102 of protective cover 100 to provide an aesthetically pleasing and sleek design. Although tablet computer 105 is shown in one viewing angle in the second user operable configuration, it should be understood that slot 120 can be configured to hold tablet computer 105 in a number of viewing angles when configured to face the keyboard 110 side or the latch 130 side of protective cover 100.

Protective cover 100 can further include a number of media buttons 140 (not shown) configured on the latch 130 side of the protective cover 100. For example, media buttons 140 can include standard media transport functions including play, pause, fast forward, rewind, record, skip, main menu, and the like. In alternative embodiments, media buttons 140 can be disposed on the bottom side 140 to perform a variety of media functions when tablet computer 105 and protective cover 100 are in the closed clam shell configuration.

Many more configurations, features, and functions can be incorporated in protective cover 100 and the other embodiments described herein. For example, protective cover 100 can include a touch panel, a fully configurable touch display, audio elements (e.g., speakers, etc.), or other input/output devices as required by design. In some cases, protective cover 100 can be water proof or submergible. Protective cover 100 can be comprised of any suitable plastic, fabric, metal, or other material that would be appreciated by one of ordinary skill in the art with the benefit of this disclosure. In some cases, a solar panel (not shown) can be integrated, embedded, or disposed on the top side 102 or bottom side 104 of protective cover 100 as a power source.

According to some embodiments, additional features may be incorporated to help better secure tablet computer 105 in each of its operable configurations. For example, friction pads can be incorporated where the tablet computer 105 makes contact with the protective cover 100 in the clamshell configuration to help prevent the tablet computer 105 from sliding out of position. Furthermore, magnets can also be used alone or in combination with friction pads to better hold the tablet computer 105 in the various configurations and operable configurations (e.g., clam shell, operable configurations, etc.), as further described with respect to FIGS. 18-20. Further still, some embodiments may include switches or detection means to determine the configuration of the tablet computer 105 with respect to protective cover 100. For example, reed switches may be used in the slot 120 to determine the angle and/or position of the tablet computer 105 to ensure that protective cover 100 is in the correct mode of operation, as further discussed below with respect to FIGS. 17-19.

Latch Mechanism

Figure 4:
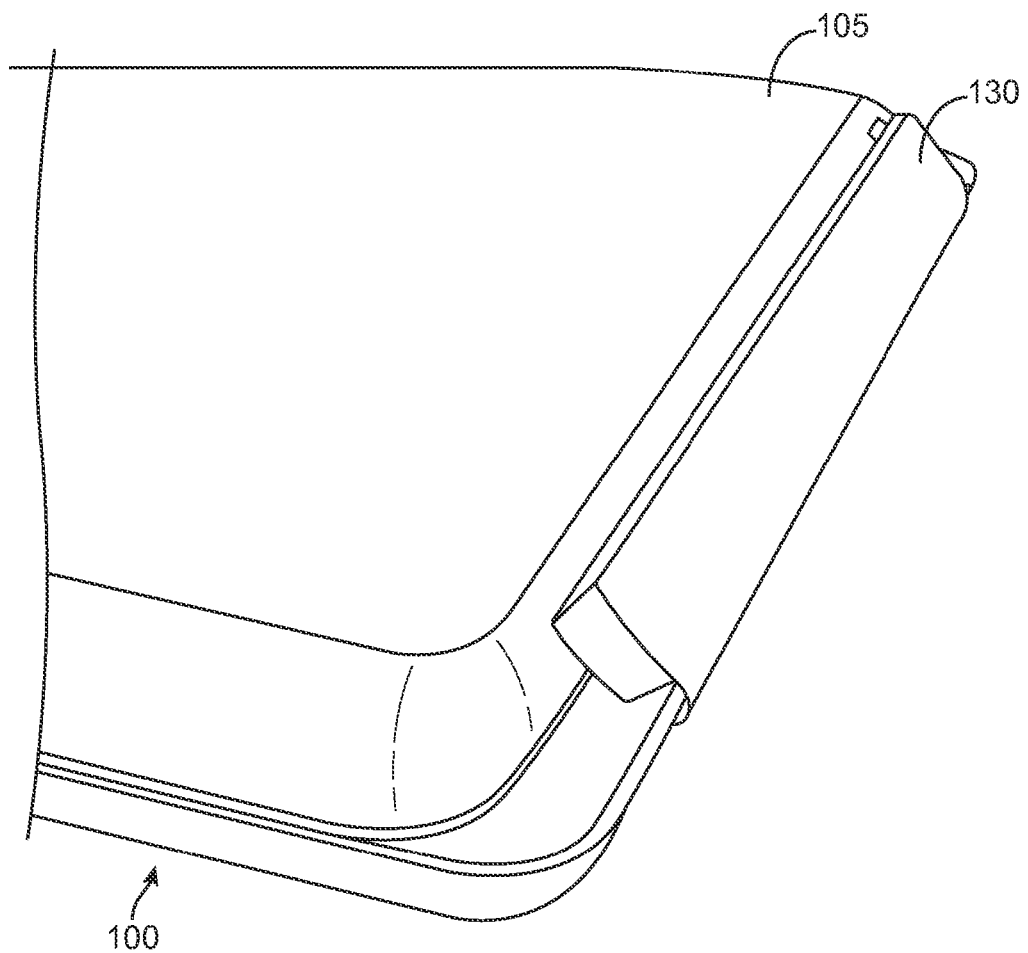
FIG. 4 depicts a perspective view of protective cover with a latch mechanism configured to attach to a tablet computer 105, according to an embodiment of the invention.

FIG. 4 depicts a perspective view of protective cover 100 with a latch mechanism 130 configured to attach to a tablet computer 105, according to an embodiment of the invention. In some embodiments, protective cover 100 can be slightly longer than tablet computer 105 to accommodate and provide enough space for latch 130 to pop out and into position without being blocked by the tablet computer 105. For example, if the tablet computer is positioned to be flush against the back end (i.e., latch 130 side) of protective cover 100, latch 130 would not be able to rotate open since tablet 105 would be blocking it. In some embodiments, protective cover 100 and tablet computer 105 can be substantially the same length with a fully functional auto-latch mechanism 130, as further described in FIGS. 6-15. Latch 130 can be integrated (e.g., embedded) into protective cover 100 and operable in any suitable manner that functions to secure the tablet computer 105 to the protective cover 300. For instance, the latch 350 may pop out (i.e., rotate out) of the bottom side 104 or the top side 102 of protective cover 100.

In some embodiments, there may be multiple latches configured to attach or detach tablet computer 105 to protective cover 100.

Figure 5A:
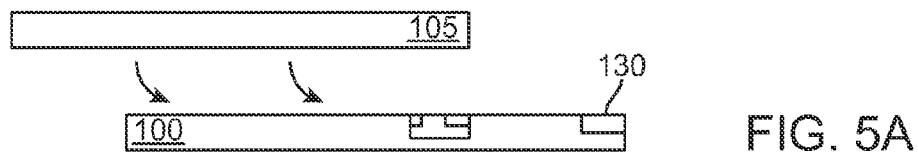
FIG. 5A depicts a detached tablet computer coming into proximity with protective cover, according to an embodiment of the invention.
Figure 5B:
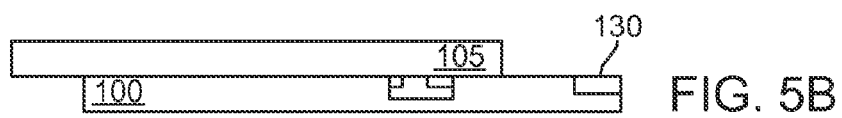
FIG. 5B depicts tablet computer in contact with the protective cover, but not yet secured in a closed configuration via hinge, according to an embodiment of the invention.
Figure 5C:
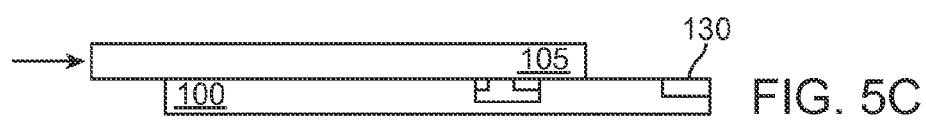
FIG. 5C depict tablet computer in contact with the protective cover where each subsequent figure shows tablet computer being pushed successively closer to hinge, according to an embodiment of the invention.
Figure 5D:
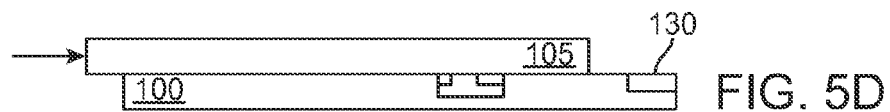
FIG. 5D depict tablet computer in contact with the protective cover where each subsequent figure shows tablet computer being pushed successively closer to hinge, according to an embodiment of the invention.
Figure 5E:
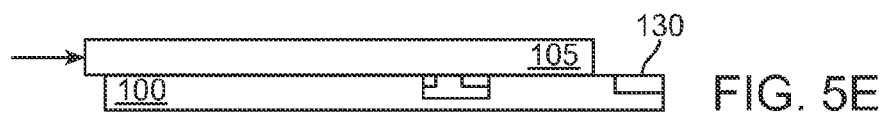
FIG. 5E depict tablet computer in contact with the protective cover where each subsequent figure shows tablet computer being pushed successively closer to hinge, according to an embodiment of the invention.
Figure 5F:
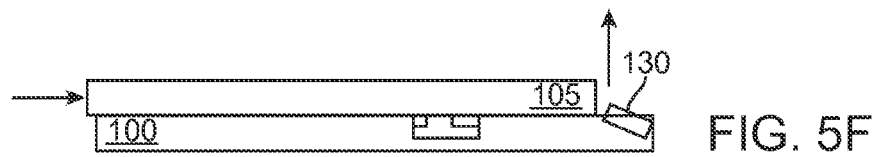
FIG. 5F depicts tablet computer in contact with protective cover and being pushed closer to hinge, according to an embodiment of the invention
Figure 5G:
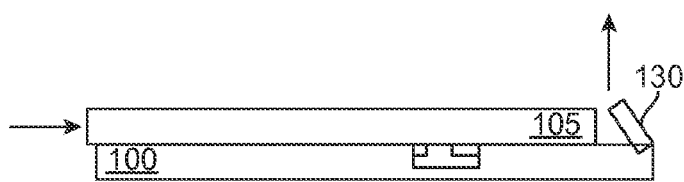
FIG. 5G depicts tablet computer in contact with protective cover and being pushed yet closer to hinge, according to an embodiment of the invention.
Figure 5H:
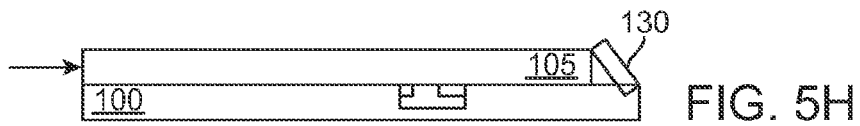
FIG. 5H depicts tablet computer in contact with protective cover and pushed completely into a closed configuration such hinge contacts and secures tablet computer to protective cover, according to an embodiment of the invention.

FIGS. 5A-5H depict a succession of stages for configuring the protective cover 100 in a closed clamshell configuration, according to certain embodiments of the invention. FIG. 5A depicts a detached tablet computer 105 coming into proximity with protective cover 100, according to an embodiment of the invention. FIG. 5B depicts tablet computer 105 in contact with the protective cover 300, but not yet secured in a closed configuration via hinge 130. FIGS. 5C-5E depict tablet computer 105 in contact with the protective cover 100 where each subsequent figure shows tablet computer 105 being pushed successively closer to hinge 130. In each case, the hinge 130 remains flush with protective cover 100. FIG. 5F depicts tablet computer 105 in contact with protective cover 100 and being pushed closer to hinge 130, according to an embodiment of the invention. When tablet computer 105 is sufficiently close to hinge 350, the hinge pops out from the flush position by magnetic attraction with the tablet computer 105. For example, a magnet (not shown) disposed within latch 130 is magnetically attracted to a magnet disposed in the tablet computer, causing latch 130 to rise (i.e., rotate upwards from the flush position). FIG. 5G depicts tablet computer 105 in contact with protective cover 100 and being pushed yet closer to hinge 130, according to an embodiment of the invention. The tablet computer 105 (and magnet disposed therein) is sufficiently close to latch 130 such that the latch is fully extended and in position to make contact and secure tablet computer 105 in a closed configuration. FIG. 5H depicts tablet computer 105 in contact with protective cover 100 and pushed completely into a closed configuration such hinge 130 contacts and secures tablet computer 105 to protective cover 100, according to an embodiment of the invention.

Figure 5I:
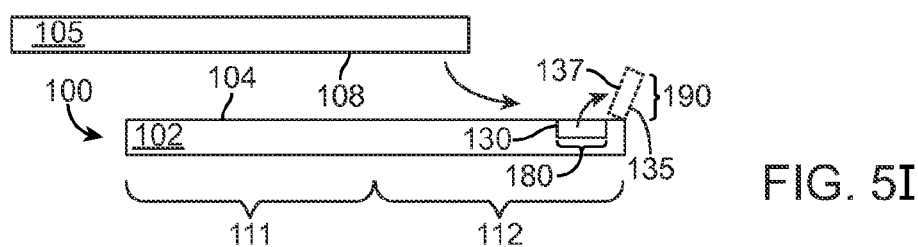
FIG. 5I illustrates an input device coupling to a protective cover in a closed configuration, according to an embodiment of the invention.

FIG. 5I illustrates an input device 105 coupling to a protective cover 100 in a closed configuration, according to an embodiment of the invention. Protective cover 100 includes a housing 102, which can be the body of protective cover 100. Housing 102 can include slot 120 and latch mechanism 130. Housing 102 can include a front portion 111, which may include a plurality of keys (not shown) disposed therein, and a back portion 112, which can include the latch mechanism 130. Furthermore, housing 102 can include a surface 104. Latch mechanism 130 can include a top side 135 and a bottom side 137. In some aspects, latch mechanism 130 can be hingeably coupled or connected to the back portion 112 of housing 102. The input device 105 can include a surface 108. For example, surface 108 can be any suitable display (e.g., touch sensitive screen, LCD screen, etc.), as would be appreciated by one of ordinary skill in the art.

In some embodiments, latch mechanism 130 can be configured to couple to and secure input device 105 (e.g., surface 108) to surface 104 of housing 102. Furthermore, latch mechanism 130 can be configured to rotate, via the hinge coupling, between a first configuration 180 and a second configuration 190. In some embodiments, the first configuration is a closed position with top side 135 of latch mechanism 130 flush with surface 104 of housing 102, and bottom side 137 of latch mechanism 130 embedded within housing 102 such that latch mechanism 130 does not protrude from the housing. Further, the second configuration 190 can be an open position such that latch mechanism 130 is rotated relative to the closed position (e.g., first configuration 180) and protrudes from housing 102. In certain aspects, latch mechanism 130 is operable to be rotated open from first configuration 180 to second configuration 190 via the hinge coupling. As described above, latch mechanism 130 can include a magnet (not shown) operationally configured to couple the latch mechanism to the input device 130 (e.g., tablet computer). In some embodiments, latch mechanism 130 is operable to automatically open from first configuration 180 to second configuration 190 in the presence of a magnetic field. For example, input device 105 can include a magnet disposed therein where, when brought in proximity to the magnet in latch mechanism 130, the latch rises due to the magnetic attraction between the two magnets, as shown in FIGS. 5E-5H.

In certain embodiments, the magnet (not shown) in latch mechanism 130 can provide a magnetic force operable to increase a retention strength of the latch mechanism 130. The retention strength can be related to an amount of force required to remove the input device from the latch mechanism 130. For example, when detaching the tablet computer 105 from the protective cover 100. In some embodiments, the latch magnet(s) can provide a magnetic force of a magnitude such that the retention strength of the latch mechanism 130 is greater than a combined weight of the protective cover 100 and the input device (e.g., tablet cover 105). For example, if a protective cover 100 and a tablet computer 105 were in the closed clamshell configuration with the latch mechanism 130 magnetically coupled to the tablet computer 105 (e.g., magnetically coupled to another magnet disposed in tablet computer 105), a user could pick up the combination of the protective cover 100 and tablet computer 105 with one hand (e.g., grasping only tablet cover 105) and the latch mechanism 130 would not break the connection (i.e., magnetic coupling) with tablet computer 105. Thus, a user would typically have to overcome the retention strength to break the connection. In some cases, the retention strength of the latch can be reduced when the input device (e.g., tablet computer 105) is coupled to the latch in the open position, and the input device is moved past a threshold angle relative to the housing. In other words, a user moves tablet computer 105 from protective cover 100 similar to the way a book is opened (e.g., protective cover 100 being the back cover resting on a surface and tablet computer 105 being the front cover being opened at an angle relative to the back cover. In certain embodiments, the threshold angle is typically greater than 45 degrees. In further embodiments, the retention strength of latch mechanism 130 can be reduced when a lateral force is applied to the input device (i.e., a force perpendicular to the magnetic force between latch mechanism 130 and tablet computer 105).

Alternatively, other methods and/or features can be used to improve the retention strength of both the latch mechanism 130 and slot 120. For example, instead of magnets, other features like hooks and loops, retaining pins, brads, adhesives, electro-magnets, compounds exhibiting improved coefficients of friction, suction, stiff hinges, stiff slots, and other means that would be appreciated by one of ordinary skill in the art with the benefit of this disclosure.

Figure 6:
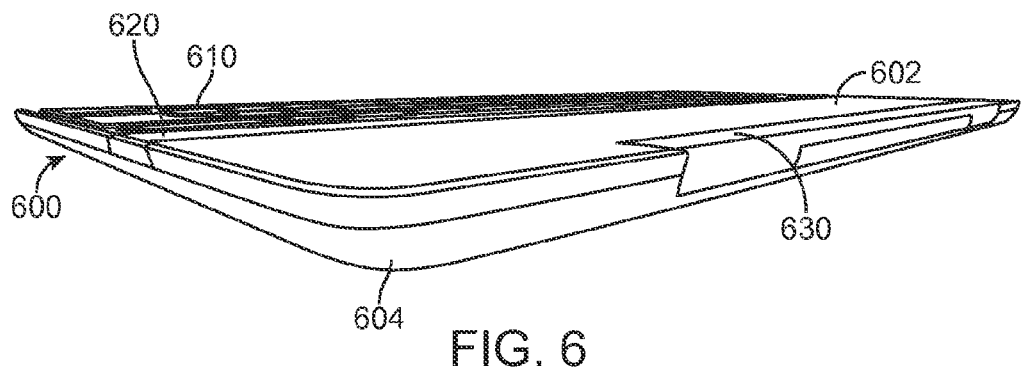
FIG. 6 depicts a perspective view of a protective cover with a latch mechanism configured to attach to a tablet computer, according to an embodiment of the invention.

FIG. 6 depicts a perspective view of a protective cover 600 with a latch mechanism 630 configured to attach to a tablet computer 105, according to an embodiment of the invention. The latch 630 can rotate into an open position and slide out laterally toward the back of protective cover 600, as further described below. The protective cover 600 includes a top portion 602 and a bottom portion 604. The top portion includes a keyboard 610, a slot 620, and a latch mechanism 630. In a closed configuration (not shown), the protective cover 100 can be configured to fit securely over a tablet computer 105 in a clam shell configuration to protect it from damage (e.g., scratches, dents, shock damage, etc.). Latch 630 is operable to move from a closed position (as shown—embedded within the top portion 602) to an open position to attach to a portion of the tablet computer 105 (e.g., via magnet coupling, mechanical coupling, etc.) to hold and maintain and secure the clam shell configuration. In an open position, the slot 620 can hold the tablet computer 105 in a number of different upright positions to provide an optimum viewing angle for a user. The protective cover 100 can further provide a number of input features and functions including, but not limited to, an alphanumeric keyboard 610 and media buttons (not shown).

In some embodiments, the latch 130 is integrated in the top side 102 of the back of protective cover 100 and configured to automatically pop out from a flush position (flush to the top side 602) and attach to tablet computer 105 when the edge of tablet computer 105 is in close proximity to latch 130, as shown in FIGS. 7A-7E. The auto-latch capabilities can be performed by magnetic means, electromagnetic means, mechanical means, motion detection, proximity detection, or any other technology that would be appreciated by one of ordinary skill in the art with the benefit of this disclosure. For example, protective cover 600 can be operable to detect a magnet within the tablet computer 105 and automatically open the latch 630 to affix or couple the tablet computer 105 to protective cover 600 in the clamshell position.

Figure 7A:
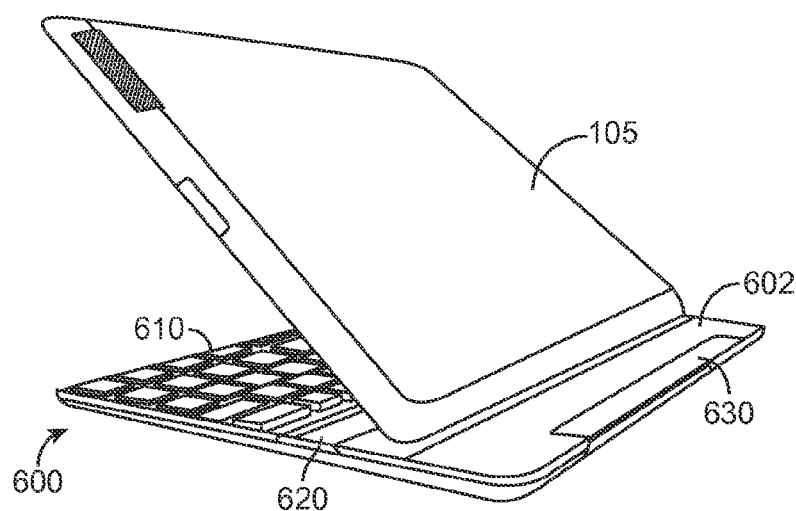
FIG. 7A depicts a process of attaching a tablet computer to a protective cover, according to an embodiment of the invention.
Figure 7B:
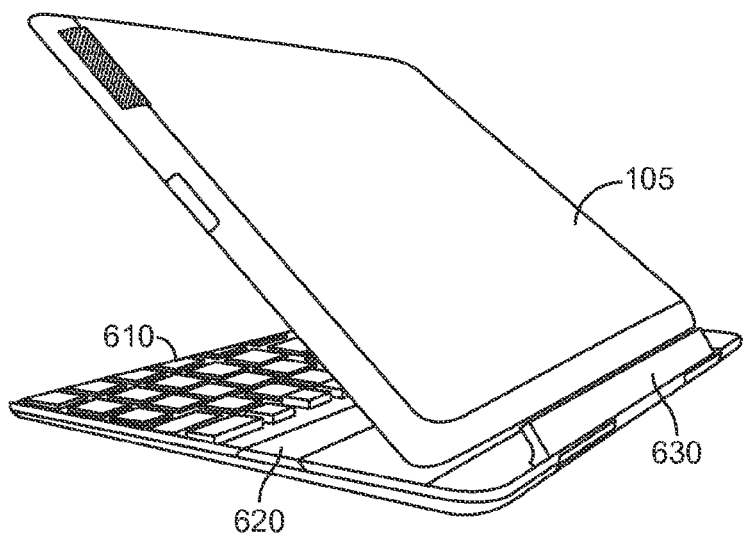
FIG. 7B depicts a process of attaching a tablet computer to a protective cover, according to an embodiment of the invention

FIG. 7A depicts a process of attaching a tablet computer 105 to a protective cover 600, according to an embodiment of the invention. In FIG. 7A, tablet computer 105 is approaching hinge 630, but is not yet attached. Hinge 630 remains flush with protective cover 600. FIG. 7B depicts a process of attaching a tablet computer 105 to a protective cover 600, according to an embodiment of the invention. In this case, tablet computer 105 is sufficiently close to hinge 350 such that hinge 630 pops out from the flush position due to its magnetic attraction to tablet computer 105. For example, a magnet (not shown) disposed within latch 630 is magnetically attracted to a magnet disposed in the tablet computer, causing latch 630 to rise (i.e., rotate upwards from the flush position).

Figure 7C:
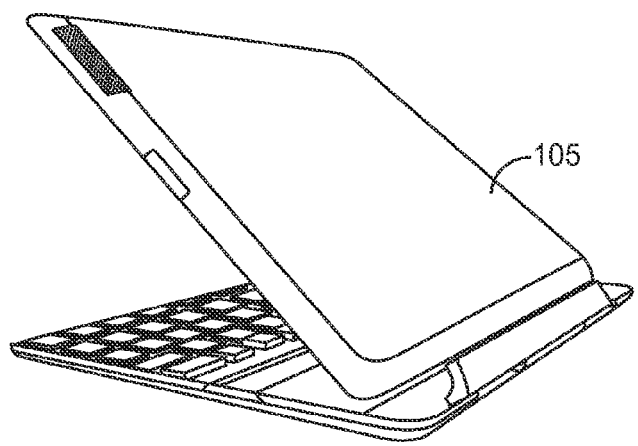
FIG. 7C depicts tablet computer being pushed yet closer to hinge, according to an embodiment of the invention.
Figure 7D:
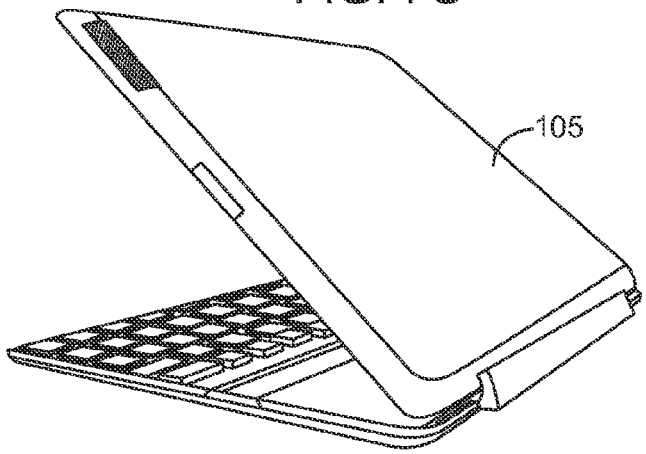
FIG. 7D depicts tablet computer in contact with protective cover, according to an embodiments of the invention.
Figure 7E:
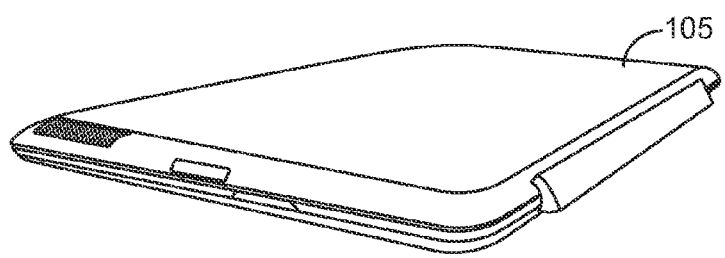
FIG. 7E depicts tablet computer in contact with protective cover in a fully closed clamshell configuration, according to an embodiment of the invention.

FIG. 7C depicts tablet computer being pushed yet closer to hinge 630, according to an embodiment of the invention. Tablet computer 105 (and a magnet disposed therein) is sufficiently close to latch 630 such that latch 630 is fully extended (i.e., rotated in a fully open configuration) and in a position to make contact with and secure tablet computer 105 in a closed clamshell configuration. FIG. 7D depicts tablet computer 105 in contact with protective cover 600, according to an embodiments of the invention. In addition to latch 630 being fully extended in a fully open and rotated position, latch 630 is also pushed out laterally from the back of protective cover 600, thus allowing tablet computer 105 to be aligned with protective cover 600 when closed in the clamshell configuration. Protective cover 600 differs from protective cover 100 in this respect. In some embodiments, protective cover 100 is longer (front-to-back) than tablet computer 105 such that latch 130 has enough room to rotate open and couple to tablet computer 105, as shown in FIG. 4. Protective cover 600, in contrast, rotates open (or pivots) and laterally slides out from the back of protective cover 600. Thus, protective cover 600 can be the same size as tablet computer 105. FIG. 7E depicts tablet computer 105 in contact with protective cover 600 in a fully closed clamshell configuration, according to an embodiment of the invention. As shown, the tablet computer 105 and protective cover 600 are aligned over one another and substantially the same size. Latch 105 is engaged (e.g., coupled to) with tablet computer 105, securing the two together. In some embodiments, once tablet computer 105 is detached from latch 630, it can rotate and slide back into its initial position flush against top portion 602.

Figure 7F:
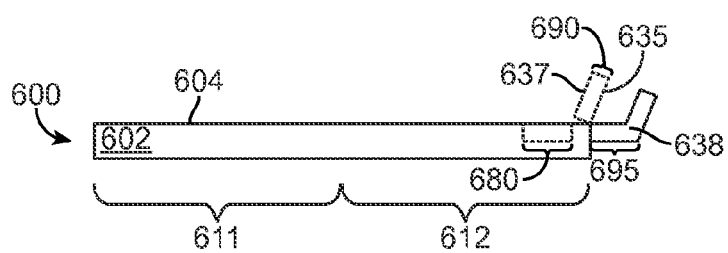
FIG. 7F illustrates an input device coupling to a protective cover in a closed configuration, according to an embodiment of the invention.

FIG. 7F illustrates an input device 105 coupling to a protective cover 600 in a closed configuration, according to an embodiment of the invention. Protective cover 600 includes a housing 602, which can be the body of protective cover 100. Housing 602 can include slot 620 and latch mechanism 630. Housing 602 can include a front portion 611, which may include a plurality of keys (not shown) disposed therein, and a back portion 612, which can include the latch mechanism 630. Furthermore, housing 602 can include a surface 604. Latch mechanism 630 can include a top side 635 and a bottom side 637. In some aspects, latch mechanism 630 can be hingeably coupled or connected to the back portion 612 of housing 602, such that latch mechanism 630 can rotate, via the hinge coupling, from closed position (first configuration) 680 to open position (second configuration) 690, and slideably coupled to housing 602 such that latch mechanism 630 is configured to laterally slide out from back portion 612 of housing 602 to an extended position (third configuration) 695. In certain embodiments, the bottom side 637 of latch mechanism 630 configured to couple to and secure an input device 105 to the surface 604 of housing 602, such that surface 608 of input device 105 is opposite and adjacent to surface 604 of housing 602. For example, surface 608 can be any suitable display (e.g., touch sensitive screen, LCD screen, etc.), as would be appreciated by one of ordinary skill in the art.

In some embodiments, the first configuration 680 is a closed position with top side 635 of latch mechanism 630 flush with surface 604 of housing 602 and the bottom side 637 of latch mechanism 630 is embedded within housing 602 such that latch mechanism 630 does not protrude from the housing. The second configuration 190 can be an open position such that latch mechanism 630 is rotated relative to the closed position (e.g., first configuration 680) and protrudes from housing 602. In certain aspects, latch mechanism 130 is operable to be rotated open from first configuration 180 to second configuration 190 via the hinge coupling. The third configuration (extended position) 195 can be configured such that latch mechanism is laterally extended from the back portion 612 of housing 602. As described above, latch mechanism 630 can include a magnet (not shown) operationally configured to couple latch mechanism 630 to input device 130 (e.g., tablet computer). In some embodiments, latch mechanism 630 is operable to automatically open from first configuration 180 to second configuration 190 in the presence of a magnetic field. For example, input device 105 can include a magnet disposed therein where, when brought in proximity to the magnet in latch mechanism 130, the latch rises due to the magnetic attraction between the two magnets, similar to the images of FIGS. 5E-5H.

Figure 8A:
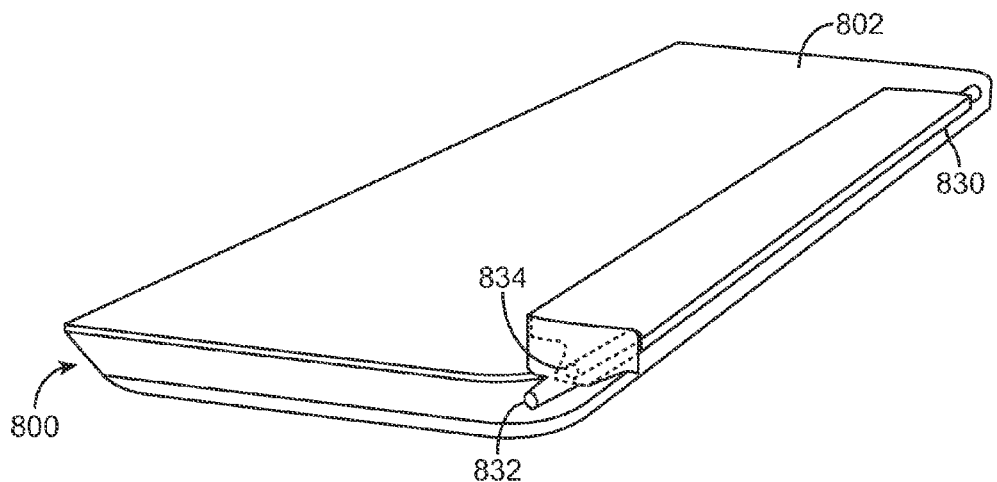
FIG. 8A illustrates a simplified diagram of a latch structure for a protective cover, according to an embodiments of the invention.

FIG. 8A illustrates a simplified diagram of a latch structure for a protective cover 700, according to an embodiments of the invention. The protective cover 800 includes a top portion 802 and a latch mechanism 830 disposed therein. In a closed configuration (not shown), the protective cover 100 can be configured to fit securely over a tablet computer 105 in a clam shell configuration to protect it from damage (e.g., scratches, dents, shock damage, etc.), similar to the protective covers 100 and 600, shown in FIGS. 4 and 6, respectively. In some embodiments, the latch 830 is configured on a slanted track 832 in the top case (i.e., upper portion of protective cover 800 including top portion 802), such that hinge 830 can slide diagonally upwards from a flush position (i.e., flush with respect to top portion 802) in response to a magnetic field. Once hinge 830 slides to the top of slanted track 832 at, it can pivot and rotate at pivot point 834 causing the hinge to open, similar to hinges 130 and 630 described above. In some cases, hinge 830 can slant backwards with rotation and can be triggered by magnetic force, mechanical force, or other suitable means.

Figure 8B:
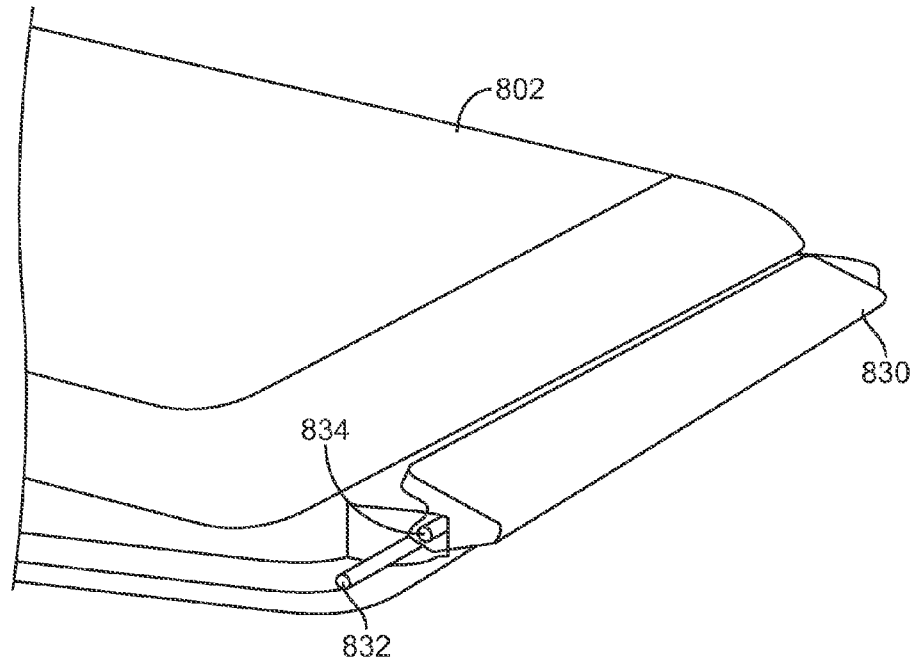
FIG. 8B depicts a process of attaching a tablet computer to a protective cover, according to an embodiment of the invention.
Figure 8C:
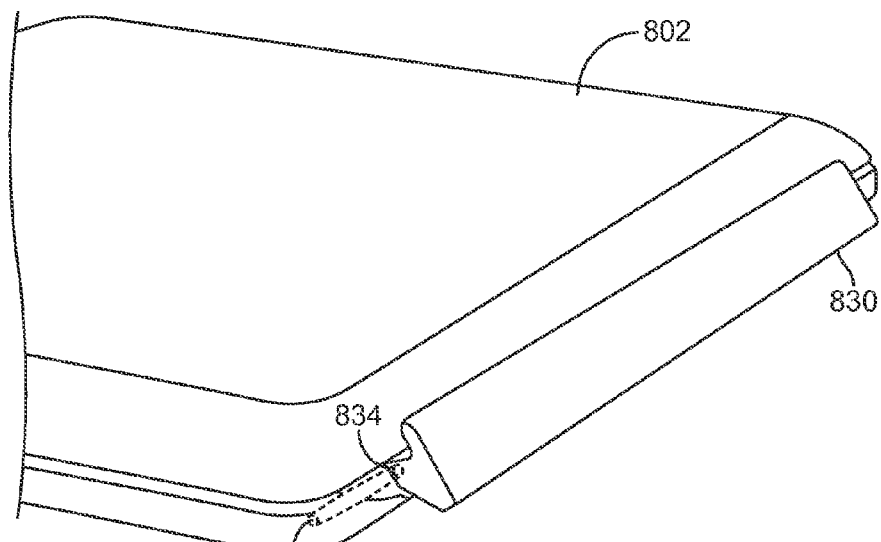
FIG. 8C depicts tablet computer engaged with latch and securing the tablet computer 105 to protective cover.
Figure 8D:
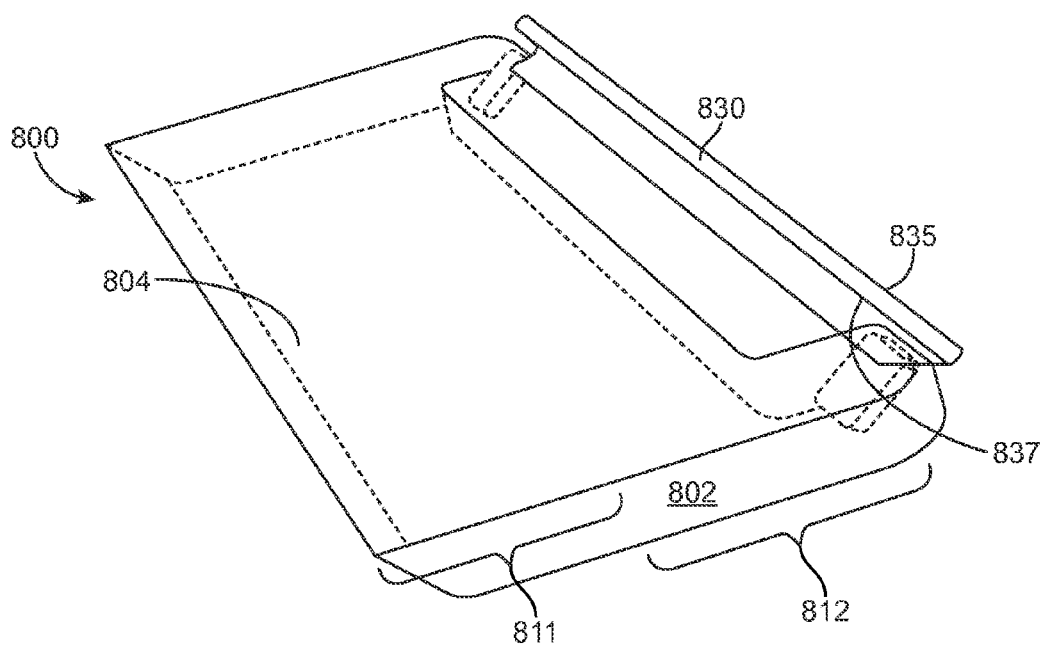
FIG. 8D depicts latch moving back into a closed position once the tablet computer is removed, according to an embodiment of the invention.

FIG. 8B depicts a process of attaching a tablet computer 105 to a protective cover 800, according to an embodiment of the invention. In FIG. 8B, tablet computer 105 is approaching hinge 830 and is sufficiently close such that hinge 630 begins to slide diagonally upwards out from the flush position to the pivot point 834 due to its magnetic attraction to tablet computer 105. As shown in FIG. 8B, latch 830 is automatically raised once the tablet computer (e.g., iPad) gets close to latch 830. FIG. 8C depicts tablet computer 105 engaged with latch 830 and securing the tablet computer 105 to protective cover 800, according to an embodiment of the invention. As shown, latch 830 has slid up the slanted track 832 and is seated at pivot point 834 where it is rotated backwards such to secure the tablet computer 105 in a fitting position, such that tablet computer 105 and protective cover 800 are properly aligned in the clamshell configuration. FIG. 8D depicts latch 830 moving back into a closed position once the tablet computer 105 is removed, according to an embodiment of the invention. In some embodiments, gravity and weight balance will cause hinge 830 to return to the closed position (i.e., hinge 830 closed and flush with top portion 802) once the tablet computer 105 (and its magnetic field) are moved away. It should be noted that other means may be used to move latch 830 into its various operating positions (i.e., closed/open positions). For example, mechanical means, pneumatic means, hydraulic means, or any suitable means as would be appreciated by one of ordinary skill in the art with the benefit of this disclosure. In some embodiments, a user can physically manipulate latch 830 to close the latch (i.e., closed and flush with top portion 802) or open latch 830 to couple to tablet computer 105 and secure it in the clamshell configuration.

Referring back to FIG. 8D, in some embodiments, protective cover 800 can include a housing 802 with surface 804, which can be the body of protective cover 800. Housing 602 can include latch mechanism 830 with a top side 835 and a bottom side 837. Housing 802 can include a front portion 811, which may include a plurality of keys (not shown) disposed therein, and a back portion 812, which can include the latch mechanism 830. In some aspects, housing 802 can include a slanted track 860 disposed within back portion 812 of housing 802. The slanted track can have a lower end 862 and an upper end 866.

In certain embodiments, latch mechanism 830 is slideably coupled to slanted track 860 such that latch mechanism 830 is configured to slide between the closed position at the lower end 862 of slanted track 860 (see FIG. 8A) to a raised position at the upper end 866 of slanted track 860 (see FIG. 8B), The latch mechanism can further be hingeably coupled to slanted track 860 such that latch mechanism 830 is configured to rotate, via the hinge coupling, from the raised position (see FIG. 8B) to a latched position (see FIG. 8C) at the upper end 866 of slanted track 860, to couple to input device 105.

In some embodiments, in the closed position the outer portion 835 of latch mechanism 830 is at the upper portion 866 of slanted track 860 and flush with surface 804 of housing 802, such that latch mechanism 830 does not protrude from surface 804 of housing 802, and the inner portion 837 of latch mechanism 803 is embedded within housing 802 such that aspects of the inner portion 837 is configured at the lower end of slanted track 860, as shown, e.g., in FIG. 8A. In some cases, in the raised position, latch mechanism 830 is raised along slanted track 860 such that inner portion 837 is at upper portion 866 of slanted track 860 and outer portion 835 is protruding above the surface of housing 802, as shown, e.g, in FIG. 8B. In the latched position (e.g., see FIG. 8C), latch mechanism 830 can be rotated relative to the raised position (e.g., see FIG. 8B) such that inner portion 837 of latch mechanism 830 is operable to attach to an input device 105, e.g., as shown in FIG. 8C.

Hinge Stopper

FIGS. 9A-9E depict a hinge 902 with a stopper 904 in a protective cover 901 to secure a tablet computer 903, according to an embodiment of the invention.

Figure 9A:
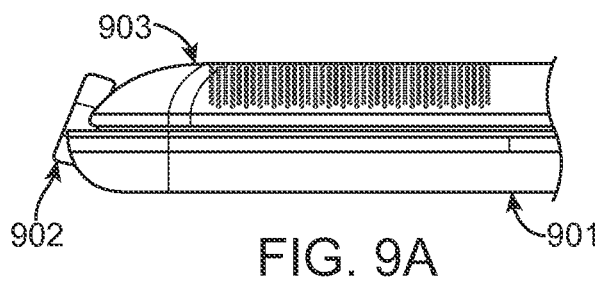
FIGS. 9A-9E depict a latch with a vertical stopper in a protective cover to secure a tablet computer, according to an embodiment of the invention.

In FIG. 9A, the tablet computer 903 is in a closed position with respect to the protective cover 901. In FIG. 9A, the hinge 902 may be on a hinge that allows the hinge 902 a limited angle of rotation with respect to the protective cover 901. In some embodiments the stopper may prevent the hinge 902 from rotating beyond a specific angle. In some embodiments, the stopper may prevent the hinge 902 and the tablet computer 903 from extending beyond a 100 degree angle. Other embodiments contemplate the stopper preventing the hinge 902 and the tablet computer 903 from extending beyond different angles.

Figure 9B:
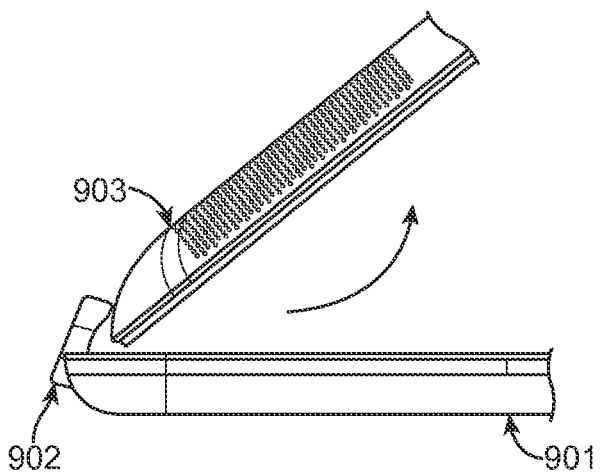

FIG. 9B depicts the motion of the tablet computer 903 being lifted into an opened position with respect to the protective cover 901. In some embodiments, when the tablet computer 903 is opened while engaged with the hinge 902, the stopper in the protective cover 901 may prevent the tablet computer 903 from being opened beyond a certain angle. For example, as depicted in FIG. 9B, the tablet computer 903 is opened to a roughly 45 degree angle with respect to the protective cover 901. In some embodiments, the hinge 902 and the tablet computer 903 can be rotated to 100 degrees, at which point, the stopper prevents the hinge 902 and the tablet computer 903 from rotating beyond 100 degrees. In some embodiments, the application of pressure to the stopper causes the stopper to release and allows the hinge 902 to rotate beyond 100 degrees. As noted above, other embodiments contemplated allow for different angles of rotation. For example, some embodiments may include a stopper that prevent the hinge 902 from rotating beyond an angle less than 100 degrees, while other prevent the hinge 902 from rotating beyond an angle greater than 100 degrees.

Figure 9C:
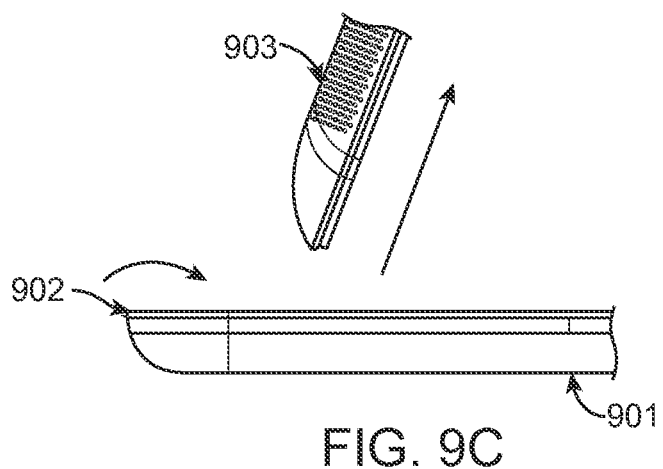

FIG. 9C depicts the hinge 902 in the closed position. The hinge 902 may be in the closed position when the tablet computer 903 is disengaged from the hinge 902 and the protective cover 901. In some embodiments, when the hinge 902 is in a closed position, the hinge 902 is contained within a recess in the protective cover 901 and is flush with the top surface of the protective cover 901.

Figure 9D:
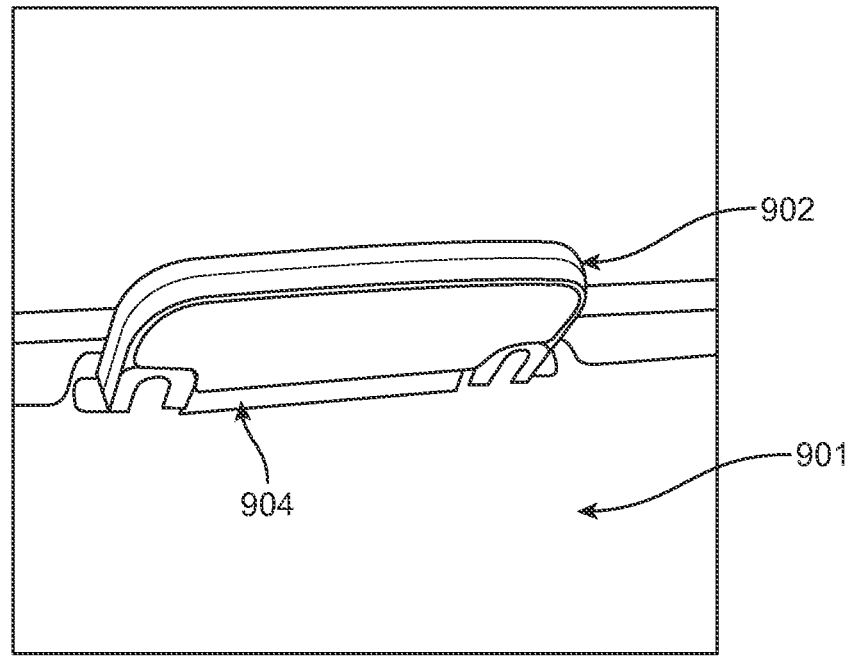

FIG. 9D depicts a forward view of the stopper 904 attached to the protective cover 901. The hinge 902 is rotatable from a closed position until the hinge 902 hits the stopper 904. In some embodiments, the stopper 904 may be fixed to the protective cover 901 such that the stopper 904 cannot be removed from the protective cover 901.

Figure 9E:
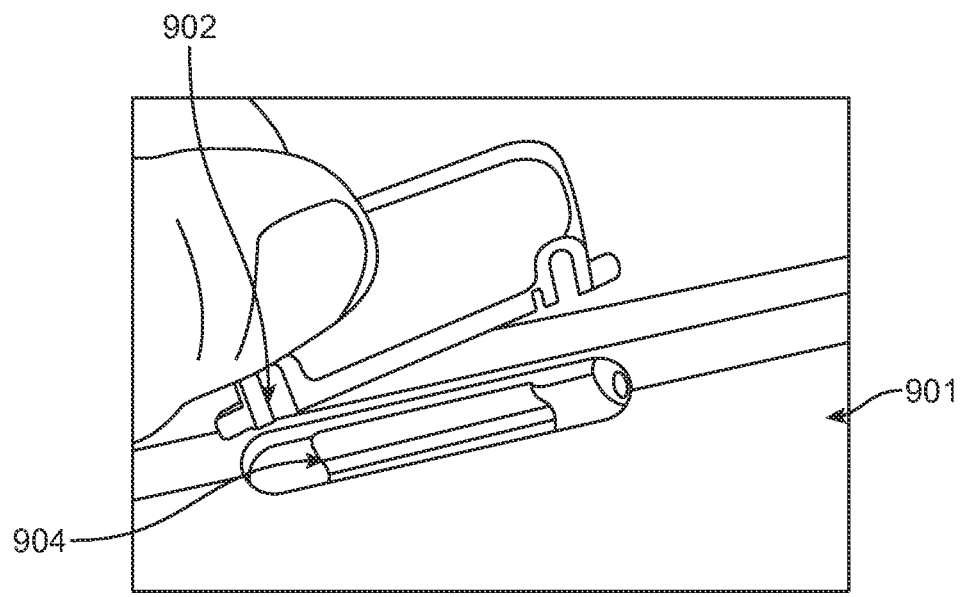

FIG. 9E depicts the hinge 902 removed from the body of the protective cover 901. In some embodiments, when a large amount of force is applied by the hinge 902 against the stopper 904, in order to prevent structural damage to the hinge 902 or the protective cover 901, the hinge 902 may pop out from the protective cover 901.

Sliding Tray

FIGS. 10A-10D depict a movable tray 1001 (which may also be referred to a as a movable keyboard tray) in a protective cover 1000, according to an embodiment of the invention. The movable keyboard tray 1001 may be disposed in a housing affixed, attached or molded to the protective cover 1000. A plurality of input members may be disposed on the movable tray. The movable keyboard tray 1001 may be configured to translate from a first position to a second position such that different recesses are opened in the protective cover 1000 when the movable keyboard tray 1001 is translated between the first and second positions. The movable keyboard tray 1001 may be configured to translate along a predefined track in the housing. In some embodiments, the movable keyboard tray 1001 may have wheels enabling translation.

Figure 10A:
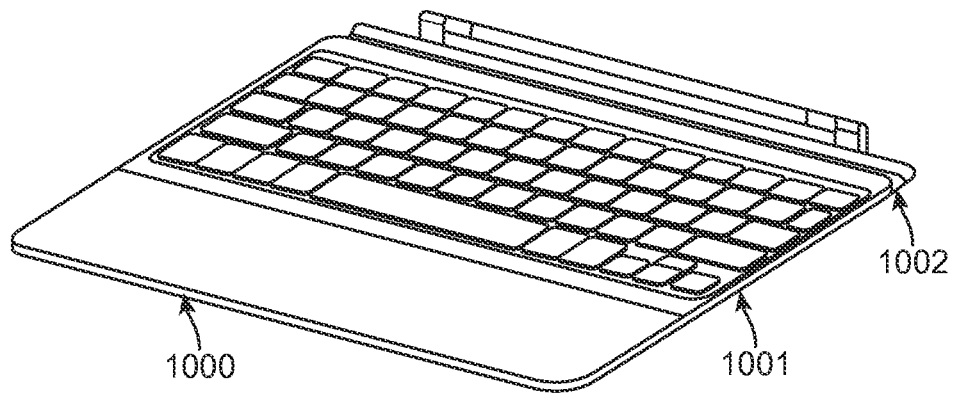
FIGS. 10A-10D depict a movable keyboard in a protective cover, according to an embodiment of the invention.
Figure 10B:
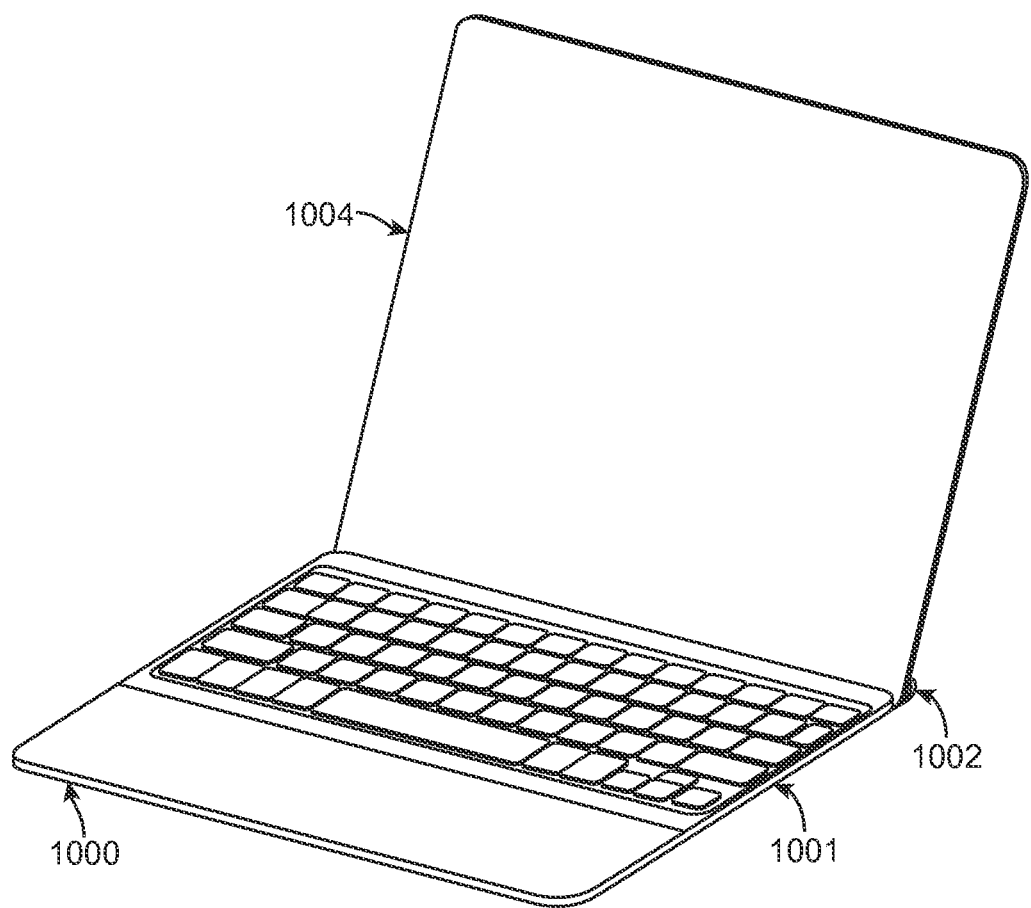

FIG. 10A depicts the movable keyboard tray 1001 in a first position with respect to the protective cover 1000. When the movable keyboard tray 1001 is in the first position, a first recess 1002 is opened in the body of the protective cover 1000. As shown in FIG. 10B, when the movable keyboard tray 1001 is in the first position, a tablet computer 1004 may be placed in the recess at an angle that allows a user to access the movable keyboard tray 1001 and the front of the tablet computer 1004. This first configuration may allow the tablet computer 1004 to be placed in a position conducive to allow the user to interact with the movable keyboard tray 1001 to send inputs to the tablet computer 1004. In other embodiments, the tablet computer 1004 may be placed in the opposite direction with the front of the tablet computer 1004 facing away from the movable keyboard tray 1001.

Figure 10C:
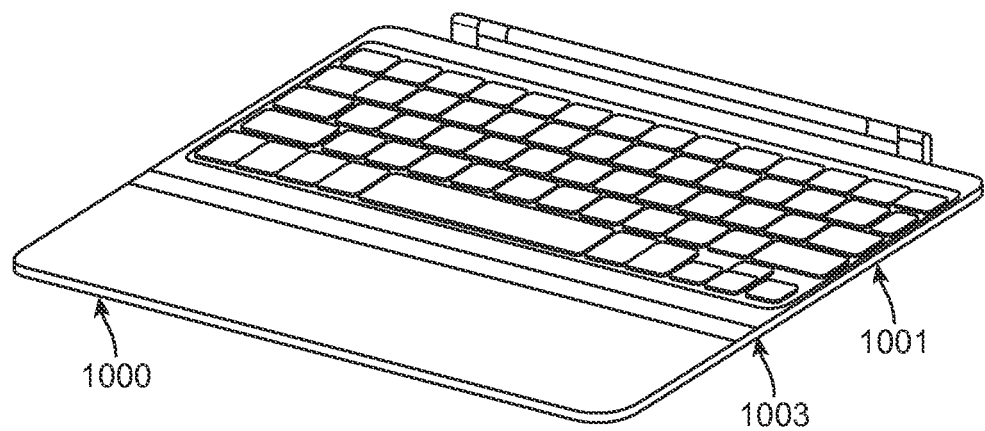
Figure 10D:
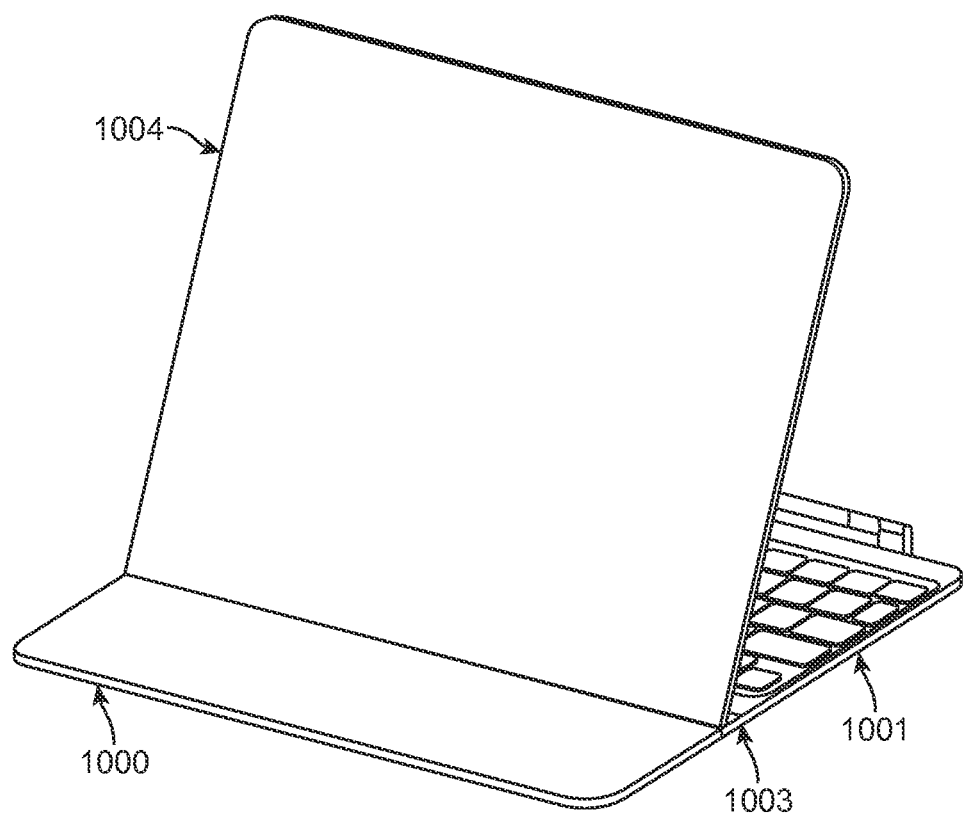

FIG. 10C depicts the movable keyboard tray 1001 in a second position with respect to the protective cover 1000. When the movable keyboard tray 1001 is in the second position, a second recess 1003 is opened in the body of the protective cover 1000. As shown in FIG. 10D, when the movable keyboard tray 1001 is in the second position, the tablet computer 1004 may be placed in the recess at an angle that allows a user to access the front of the tablet computer 1004. This second configuration may allow the tablet computer 1004 to be placed in a position conducive to allow the user view content on the tablet computer 1004 if the user does not require accessing the movable keyboard tray 1001 or sending inputs to the tablet computer 1004 by the movable keyboard 1001.

Magnets

Figure 11:
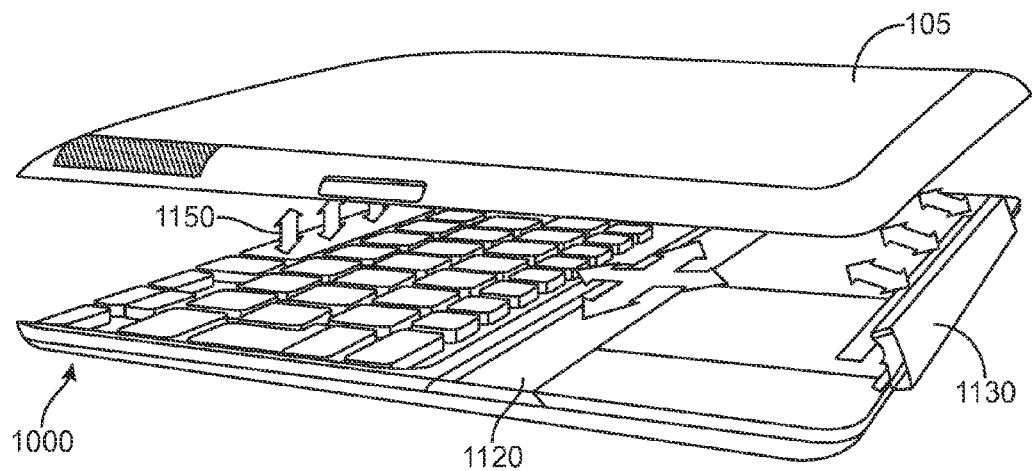
FIG. 11 depicts a plurality of magnets embedded in a protective cover, according to an embodiment of the invention

FIG. 11 depicts a plurality of magnets embedded in a protective cover 1100, according to an embodiment of the invention. Magnets can be used to secure a tablet computer in both the closed (i.e., clamshell configuration) and active configurations (tablet computer 105 placed in slot in upright position).

Figure 12:
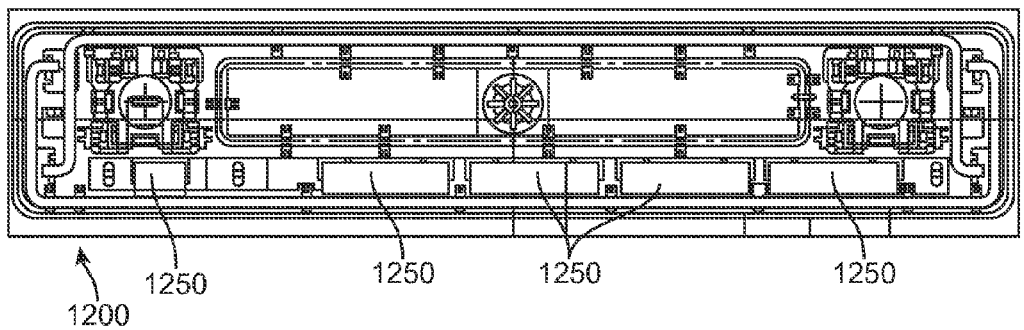
FIG. 12 depicts a space bar with magnets disposed therein, according to an embodiments of the invention.

Protective cover 1100 may include magnet(s) 1150 embedded in or around the space bar of a keyboard affixed or attached to the protective cover 1100, which can be configured to match the placement of magnets disposed within the tablet computer 105 to help hold the protective cover 1100 and tablet computer 105 in a closed (i.e., clamshell) configuration. For example, FIG. 12 depicts a space bar 1200 with magnets 1250 disposed therein, according to an embodiments of the invention. Magnets 1250 may be arranged such that they are magnetically attracted to magnets embedded in tablet computer 105 in the closed configuration. In some embodiments, magnets 1250 can be magnetically attracted to other magnetic objects. For example, magnets 1250 may be attracted to a metal chassis or frame in tablet computer 105. Magnets 1250 can further be arranged in front of space bar 1200 and embedded in the case (i.e., the main body of protective cover 1100). In some embodiments, the magnets 1250 in space bar 1200 can cause space bar 1200 to be magnetically attracted to tablet computer 105 when the protective cover is in a closed position. In some cases, the magnetic attraction causes the space bar to slightly rise to contact the tablet computer 105. This can be advantageous since support by the space bar, which typically does not have characters or glyphs silk screened or printed thereon, may prevent other keys and their printed characters from contacting tablet 105 in the closed configuration and inadvertently wearing them off over time.

Protective cover 1100 can include magnets 1130 embedded in a hinge 1130 to retain tablet computer 105 at its back end, as described above with respect of FIGS. 4-8D.

Figure 13:
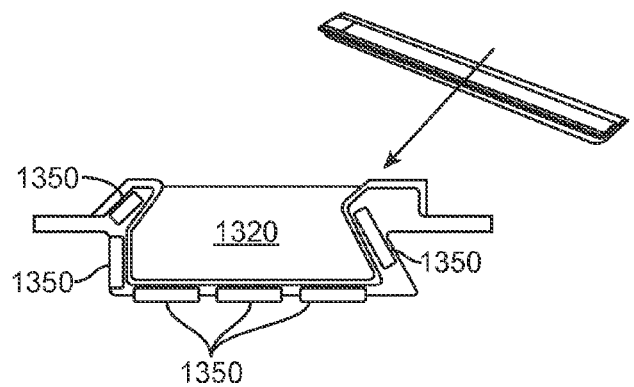
FIG. 13 depicts a particular number of magnets disposed in and/or around a slot, according to an embodiment of the invention.

In some embodiments, magnets can be disposed in or around the slot to improve the ability for a protective cover to hold a tablet computer in the active position without sliding or falling out (i.e., prevent upward and lateral or sideways movement). For example, FIG. 13 depicts a plurality of magnets 1350 disposed in and/or around the slot 1320. Magnets 1350 can be arranged such that they are magnetically attracted to magnets embedded in the tablet computer 105 in the active configuration. In some embodiments, magnets 1350 can be magnetically attracted to other magnetic objects. For example, magnets 1350 may be attracted to a metal chassis or frame in tablet computer 105. Although FIG. 13 depicts a particular number of magnets 1350 disposed in and/or around slot 1320, any number of magnets can be used. For example, some embodiments may use more or fewer magnets. Furthermore, magnets 1350 can be of any suitable size, shape, or composition. In some cases, magnets 1350 can be embedded within the slot, disposed on the surface of the slot 1320, embedded within the case (i.e., not part of the slot 1320) but close enough to hold the tablet computer 105 in an upright position. Magnets 1250 can be arranged in any suitable configuration with respect to slot 1320 as required.

In certain embodiments, the one or more magnets 1350 disposed in or around slot 1320 are configured to provide a magnetic force operable to increase a retention strength of the slot. The retention strength can be related to an amount of force required to budge or remove an input device (e.g., tablet computer 105) from slot 1320 when the input device is configured in one of the plurality of upright configurations. For example, when an input device is placed in the slot in a forward-facing upright configuration, the retention strength determines the amount of force required for a user to pull the input device out of the slot. In some embodiments, magnets 1350 provide a magnetic force of a magnitude such that the retention strength of slot 1320 is greater than a combined weight of the protective cover and the input device. For example, when an input device is placed in the slot in a forward-facing upright configuration, a user could grasp only tablet computer 105 and pick it up, thereby lifting the combination of the tablet computer 105 and protective cover because the retention strength of the slot is strong enough to hold the combined weight of the combination of the two. This may be useful if a user wants to quickly pick up the combination with one hand and move it to a new location without worrying about tablet computer 105 fallout out of the slot. In some aspects, the retention strength of the slot can be reduced when the input device is laterally moved along the slot from the one or more upright configurations or the input device is moved a threshold angle from the one of the plurality of upright configurations. For example, in the forward-facing configuration, tablet computer 105 may be resting in slot 1320 at a 72 degree angle (e.g., see FIG. 15). By moving tablet computer 105 towards 90 degrees and beyond, the retention strength of the slot can reduce such that it is easier to remove the tablet computer 105 from the slot at steeper angles. The amount of angle required to reduce the retention strength can vary by design and would be appreciated by one of ordinary skill in the art with the benefit of this disclosure.

According to some embodiments, additional features may be incorporated to help better secure the tablet computer 105 in the active and closed configurations as shown in the various embodiments described herein. For example, friction pads can be disposed where the tablet computer 105 makes contact with the protective cover in the keyboard configuration to help prevent the tablet computer 105 from sliding out of position. Moreover, slot 1320 can be raised from the top surface to provide additional lateral grip (e.g., mechanical force) to the tablet computer 105, e.g., by contacting the tablet computer 105 in a closed configuration, or providing more surface area to contact the tablet computer 105 in the active configuration. The slot can be comprised of any suitable material. For instance, the slot 380 may comprise a dual injected silicone.

It should be noted that the protective covers (e.g., 100, 400, 600, etc.) can be produced in different sizes, shapes, and configurations to accommodate a variety of different computing devices in addition to tablet computer(s) 105 including, but not limited to, smart phones, personal digital assistants, e-paper, mini-tablet computers, e-readers, and the like.

Rubberized Slot

Figure 14:
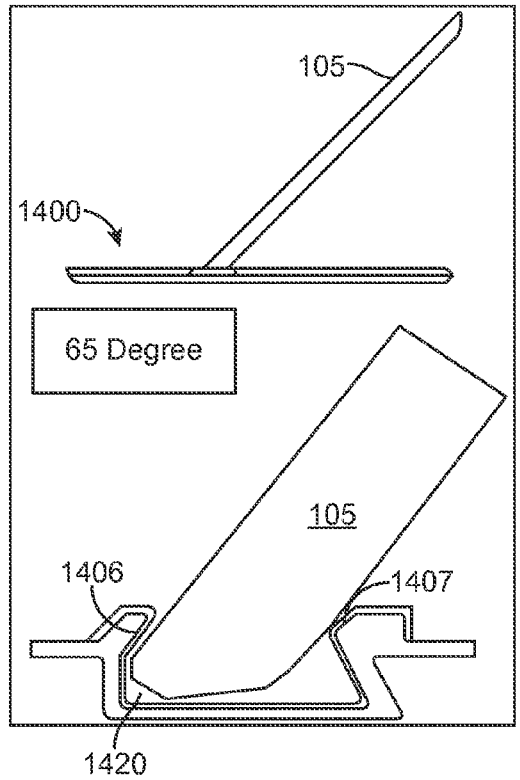
FIG. 14 illustrates a protective cover with a rubberized slot configured to hold a tablet computer in an active configuration, according to an embodiment of the invention.
Figure 15:
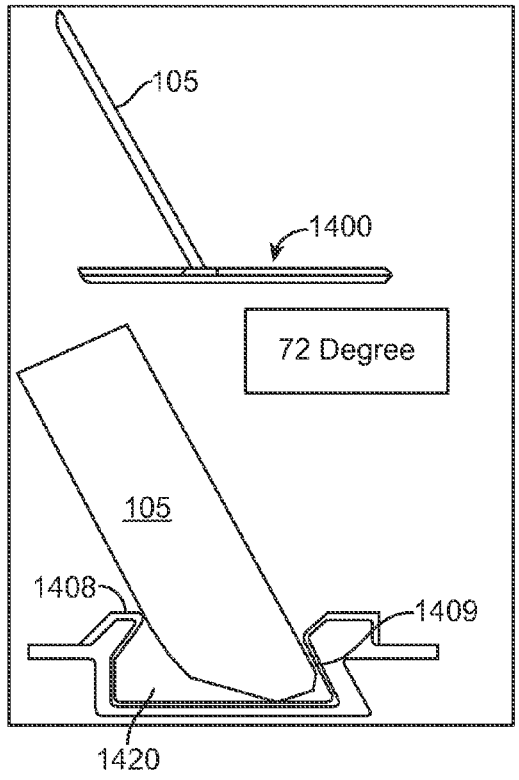
FIG. 15 illustrates a protective cover with a rubberized slot configured to hold a tablet computer in a front-facing, active upright configuration, according to an embodiment of the invention.

In some embodiments, a rubberized slot may be used for improved friction to better keep the tablet computer in a rear-facing and active upright configuration. FIG. 14 illustrates a protective cover 1400 with a rubberized slot 1420 configured to hold a tablet computer 105 in an active configuration, according to an embodiment of the invention. The tablet computer 105 is facing the back end of protective cover 1400 at a 65 degree angle. Rubberized slot 1420 can be designed and/or configured to support tablet computer 105 at any suitable viewing angle or multiple viewing angles based on the shape, depth, width, materials, etc. In an exemplary case, tablet computer 105 is supported upright at a 65 degree angle due, in part, to features 1406 and 1407 of slot 1420. FIG. 15 illustrates a protective cover 1400 with a rubberized slot 1420 configured to hold a tablet computer 105 in a front-facing, active upright configuration, according to an embodiment of the invention. The tablet computer 105 is facing the front end of protective cover 1400 at a 72 degree angle. In an exemplary case, tablet computer 105 is supported upright at a 72 degree angle due, in part, to features 1408 and 1409 of slot 1420. In some embodiments, rubberized slot 1420 can support tablet computer 105 in a number of angles due to the shape, depth, and materials used to make the slot 1420.

In some embodiments, the rubberized slot is overmolded. The overmolding can be operable to help keep tablet 105 in place against protective cover 1400 when in the closed position. For example, the overmolding can protrude high enough that it can contact protective cover 1400 in the closed position such that a friction created by the overmolded rubber can prevent the tablet from sliding around laterally while secured against the protective cover 1400.

Figure 16:
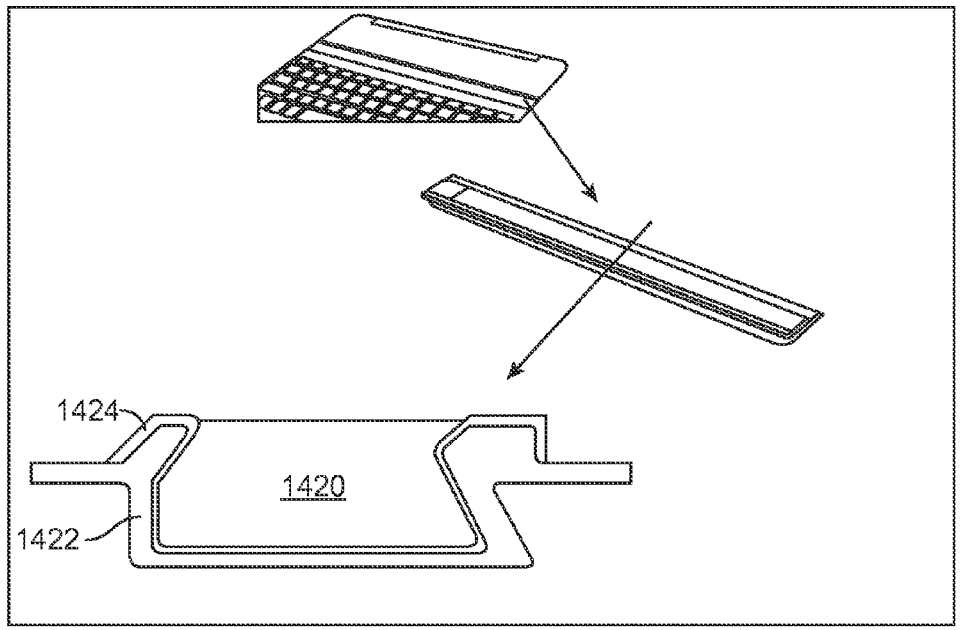
FIG. 16 illustrates a rubberized slot for a protective cover, according to an embodiment of the invention.

FIG. 16 illustrates a rubberized slot 1420 for a protective cover 1400, according to an embodiment of the invention. Rubberized slot 1420 can include a co-molding silicon rubber 1424 disposed on top of an extruded aluminum structure 1422. The silicon rubber provides high friction (i.e., an improved coefficient of friction) to hold tablet computer 105 in place without moving or sliding upwards or laterally while positioned in rubberized slot 1420. The silicon rubber can also be used to prevent sliding when tablet computer 105 is configured in the closed (clamshell) configuration with respect to protective cover 1400. In some cases, the silicon rubber at the top of rubberized slot 1420 is configured to contact a portion of tablet computer 105 to prevent lateral movement in the closed configuration. Those of ordinary skill in the art would appreciate that other suitable materials can be used with rubberized slot 1420 to improve the frictional properties of the rubberized slot.

In some embodiments, protective cover 1400 includes a housing 1402 including a front portion 1411 and a back portion 1412. In some cases; a plurality of keys (e.g., alphanumeric keyboard) may be disposed in the front portion 1411 of the housing. The slot 1420 can be disposed in the housing 1402 at any suitable location. In FIG. 14, slot 1420 is disposed above the plurality of keys (not shown). The slot can span a suitable width of housing 1402 and can be configured to hold an input device (e.g., tablet computer 105) in any of a plurality of upright configurations. In some embodiments, slot 1420 spans the entire width of housing 1402. However, slot 1420 may only span a portion of the width of 1402. Alternatively, multiple slots may be implemented and can be aligned in any suitable arrangement (e.g., longitudinally, latitudinally, diagonally, etc.). Certain embodiments include at least a forward-facing upright configuration such that the input device faces the front portion 1411 of the housing 1402 (e.g., see FIG. 15), and at least a backward-facing upright configuration such that the input device faces the back portion 1412 of the housing 1402 (e.g., see FIG. 14).

As described above, slot 1402, or a portion thereof, can be overmolded with a rubber compound to provide an improved coefficient of friction to reduce lateral slippage of the input device when held in the slot. In some aspects, the overmolded portion protrudes above the surface of the housing 1402 to that it can contact a surface of the input device 105 when the surface of the input device is configured to be opposite and adjacent to the surface of the housing, as shown, e.g., in FIG. 7E. The rubber compound can be silicon-based rubber compound. For example, slot 1420 can be molded and comprised of an extruded aluminum structure with a co-molded silicon rubber disposed thereon. In some embodiments, slot 1420 can be configured to hold input device 105 in two or more forward-facing upright configurations or two or more backward-facing upright configurations.

According to certain embodiments, one or more magnets can be disposed in or around the slot (e.g., see FIG. 13), where the magnets are configured to improve the strength of the hold that the slot has on the input device in the plurality of upright configurations.

Configuration Detection—Slot Switch

Figure 17:
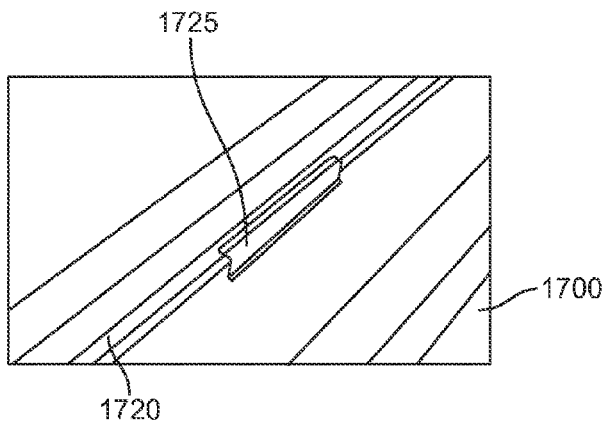
FIG. 17 illustrates a switch disposed in a slot, according to an embodiment of the invention.

FIG. 17 illustrates a switch 1725 disposed in a slot 1720, according to an embodiment of the invention. The switch 1725 is configured to detect when a tablet computer 105 is placed in the active configuration and placed in slot 1720. In some embodiments, switch 1725 can detect an orientation of the tablet computer 105 with respect to protective cover 1700. For example, switch 1725 detect if tablet 105 is in a forward facing (i.e., toward the keyboard) active configuration (e.g., similar to FIG. 15), or a rear facing (i.e., toward the latch) active configuration (e.g., similar to FIG. 14). Switch 1725 can be a mechanical switch, magnetic reed switch, optical switch, touch sensitive switch, resistive switch, temperature sensitive switch, pressure sensitive switch, or any suitable switch to detect the presence of tablet computer 105 in slot 1720, as would be appreciated by one of ordinary skill in the art.

Figure 18:
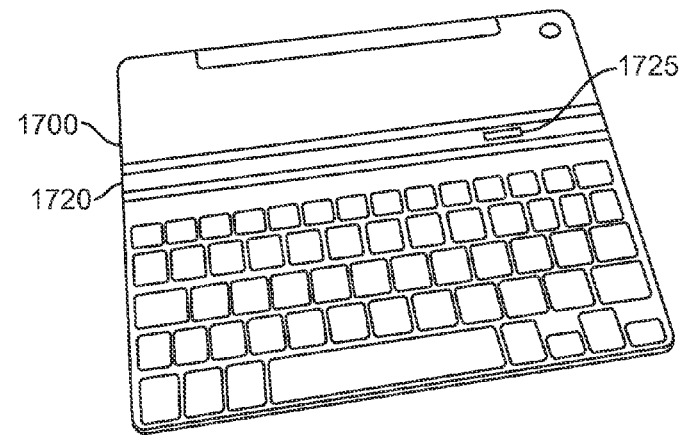
FIG. 18 illustrates a switch disposed in a slot of a protective cover, according to an embodiment of the invention

FIG. 18 illustrates a switch 1725 disposed in a slot 1720 of a protective cover 1700, according to an embodiment of the invention. Although one switch 1725 is shown, multiple switches any number of locations and/or configurations may be used to detect the presence or angle of the tablet computer 105 with respect to protective cover 1700.

Figure 19:
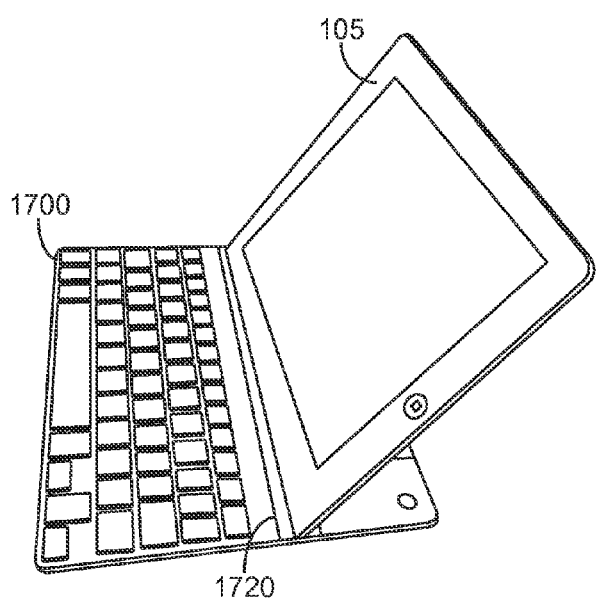
FIG. 19 illustrates a switch disposed in a slot of a protective cover, according to an embodiment of the invention

FIG. 19 illustrates a switch 1725 disposed in a slot 1720 of a protective cover 1700, according to an embodiment of the invention. Tablet computer 105 is shown in the forward facing active configuration. In certain embodiments, the switch 1725 can perform a number of other functions in addition to detecting the presence and/or orientation (angle) of the tablet computer in slot 1720. For example, activating slot 1725 can be configured to turn tablet computer 105 from an off-state to an on-state. In some aspects, the configuration of tablet 105 (e.g., forward-facing or rear-facing) may selectively turn on certain features related to the active configuration. For example, some embodiments may activate an alphanumeric keyboard when tablet computer 105 is in a forward-facing active configuration, but power down other functions not typically used in this configuration. Similarly, some embodiments may activate media control buttons (not shown) disposed toward the rear of protective cover 1700 when tablet computer 105 is in a rear-facing active configuration media. Some embodiments may shut down wireless functions (i.e., internet connections, bluetooth functionality, etc.) as well. It should be understood that the examples provided herein are not exhaustive and other power saving implementations of shutting down unused or uncommonly used functions can be used as required. In some aspects, switch 1725 operation and the functions associated therewith are controlled by a processor (e.g., processor 2110 of FIG. 21).

Macros

Keyboard macros allow short sequences of keystrokes inputted by a user to be transformed, or modified, into other sequences of keystrokes. In some embodiments, the short of sequence of keystrokes can be modified into a longer, more time-consuming sequence of keystrokes. In this way, frequently used or repetitive sequences of keystrokes can be automated. In other embodiments, the short of sequence of keystrokes can be used to represent an operation (e.g., opening/closing a program or application, textual manipulations such as delete, copy, paste and cut operations). In some embodiments, the short sequences of keystrokes may be two or more keystrokes.

Figure 20A:
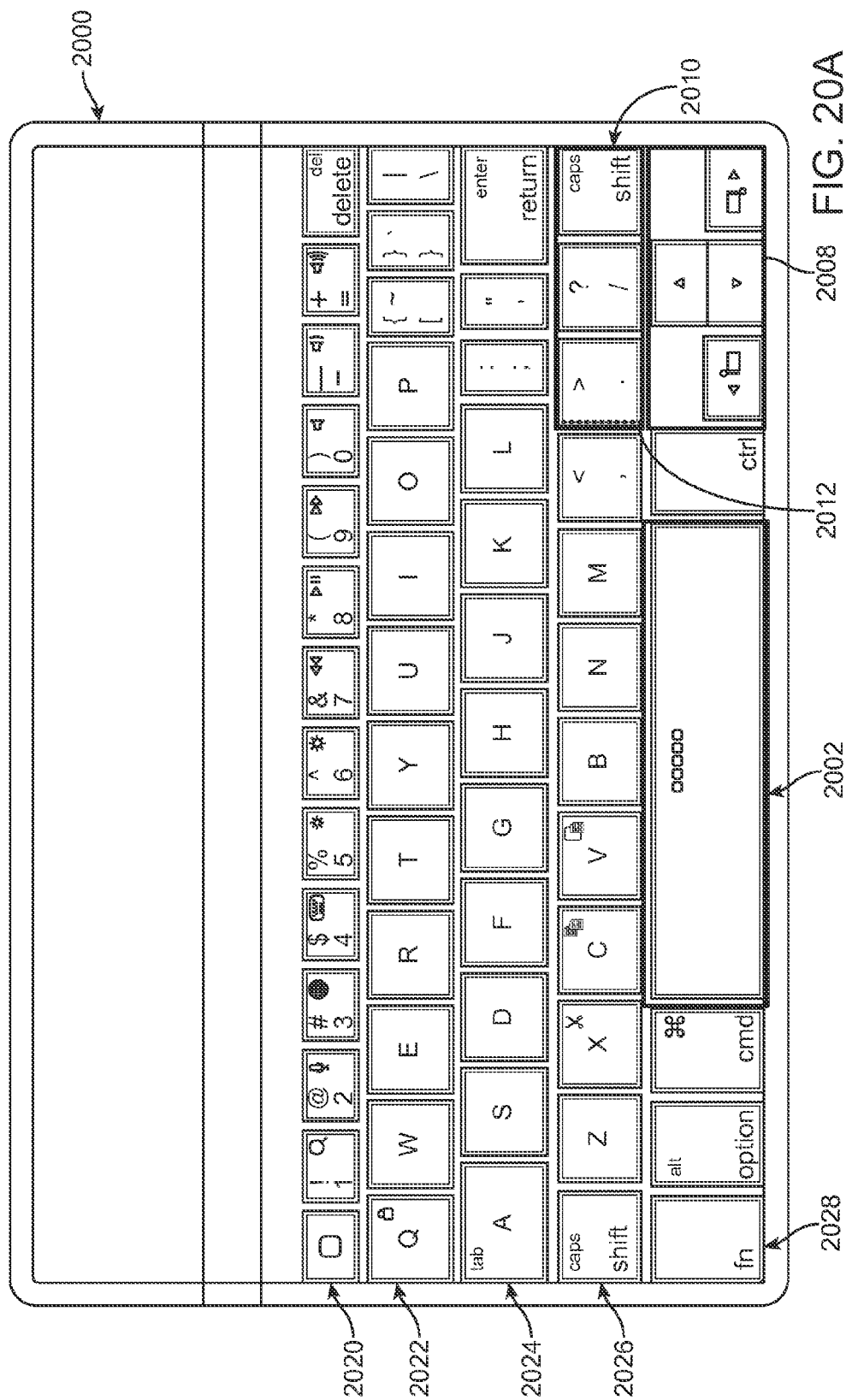
FIG. 20A depicts a top view of a keyboard according to an embodiment of the invention.

FIG. 20A depicts a top view of a keyboard 2000 configured to specify input sequences based on received keystrokes. The keyboard 2000 may also be referred to as a data input device. The keyboard 2000 may be comprised of a plurality of input members, which may also be referred to as keys or buttons, disposed on the keyboard 2000. For example, when the user interacts with the keyboard 2000 by depressing the "spacebar" button 2002, while simultaneously depressing the "fn" button 2001, the inputted keystrokes may be modified to simulate an open application operation. In some embodiments, this macro may open an application manager.

In another embodiment, when the user interacts with the keyboard 2000 by depressing the "delete" button 2003, while simultaneously depressing the "fn" button 2001, the inputted keystrokes may be modified to simulate a forward delete operation. This keyboard macro represents the "right arrow" button followed by the "delete" button.

In other embodiments, other operations or sequences of keystrokes can be mapped to inputted short sequences of keystrokes.

Functional Advantages with New Keyboard Layout

Bottom Row Keys

FIG. 20A depicts a top view of a keyboard 2000 according to an embodiment of the invention. The keyboard 2000 may also be referred to as a data input device. The keyboard 2000 may be comprised of a plurality of input members, which may also be referred to as keys, disposed on the keyboard 2000.

Figure 20B:
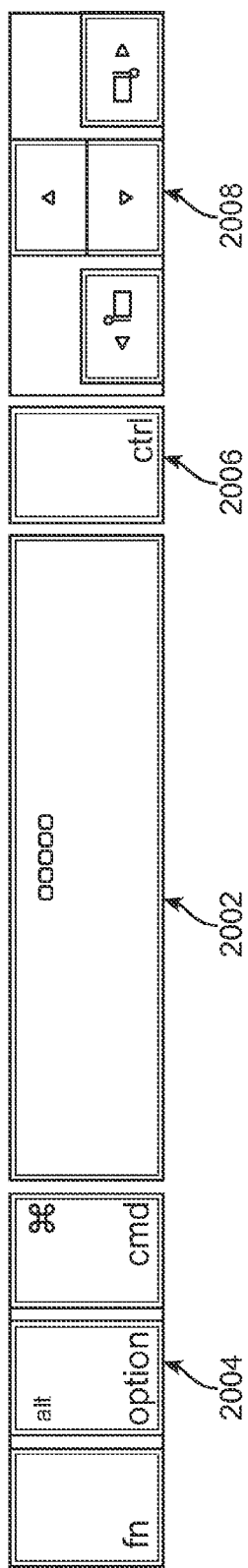
FIG. 20B depicts a bottom row of the keyboard in FIG. 20A shown in isolation, according to an embodiment of the invention.

FIG. 20B depicts a bottom row of the keyboard 2000 in FIG. 20A shown in isolation, according to an embodiment of the invention. The bottom row of the keyboard 2000 is configured such that an oversized elongated input member key 2002 is centrally located on the bottom row of the keyboard 2000. In FIG. 20B, the oversized elongated key 2002 is depicted as the "space bar" key. The oversized elongated key 2002 is adjacent to three keys 2004 of generally the same dimensions on the left side of the oversized elongated key 2002. In some embodiments, each one of the three keys 2004 has one dimension in common with the oversized elongated key 2051. In FIG. 20B, the three keys to the left of the oversized elongated key 2051 are depicted as a "fn" (or function) key, an "alt/option" (or alternate/option) key, and a "cmd" (or command) key.

The oversized elongated key 2002 is also adjacent to a single input member or key 2006, located to the right of the oversized elongated key 2002. The single key 2006 may also have dimensions identical to the three keys 2004 to the left of the oversized elongated key 2002. In FIG. 20B, the key to the right of the oversized elongated key 2002 is depicted as a "ctrl" (or control) key.

In some embodiments, and as depicted in FIG. 20B, the widths of the oversized elongated key 2002, the three keys 2004, and the single key 2006, are of generally the same dimension.

Adjacent to the single key 2006, along the bottom row of the keyboard 2000 are four smaller sized input members or keys 2008. In some embodiments, the smaller sized keys 2008 may have widths that are half or less than half of the widths of the oversized elongated key 2002. In FIG. 20B, the smaller sized keys 2008 are depicted as the directional or arrow keys (i.e., the up, down, left, and right keys).

In other embodiments, the functions of the oversized elongated key 2002, the three keys 2004, the single key 2006, and the smaller sized keys 2008 may be different than those depicted in FIG. 20B.

Second Row Key Sizes

Figure 20C:
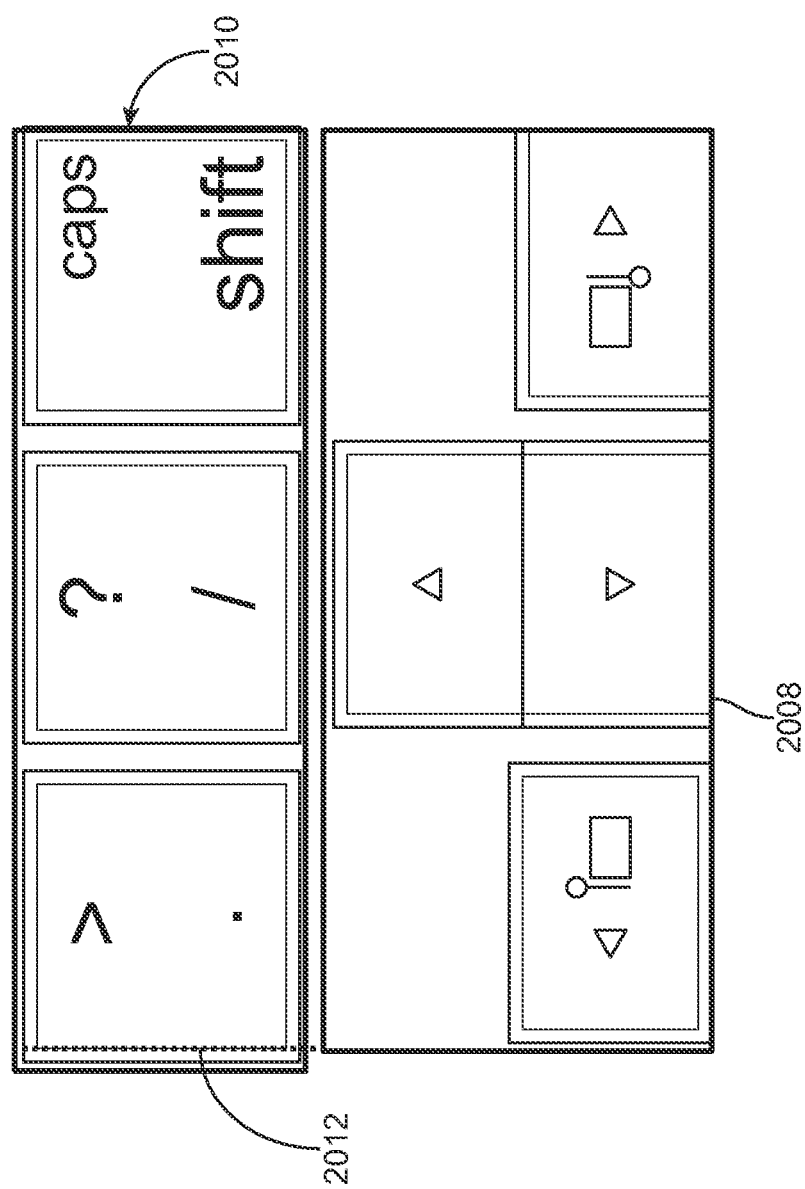
FIG. 20C-20D depict portions of the keyboard from FIG. 20A shown in isolation according to an embodiment of the invention.

FIG. 20C depicts a portion of the keyboard 2000 from FIG. 20A shown in isolation according to an embodiment of the invention. In the row above the bottom row of the keyboard 2000, above the smaller sized keys 2008, the keyboard 2000 may house a set of keys 2010. In FIG. 20C, the set of keys 2010 is depicted as the "greater than"/"period mark" key, the "question mark"/"slash" key, and the "shift"/"caps lock" key. In this embodiment, the functions of the "shift" key and "caps lock" key, which are typically separate keys, has been combined onto one key (the third key in the set of keys 2010. In this embodiment, the size of the "shift"/"caps lock" key is similar to the two adjacent keys in the set of keys 2010. In other embodiments, the functions of the set of keys 2010 may be different than those depicted in FIG. 20C.

In FIG. 20C, the combined length of the smaller sized keys 2008 is superimposed over the set of keys 2010. The combined length of the smaller sized keys 2008 is depicted as a dashed line 2012. As depicted in FIG. 20C, the combined length of the set of keys 2010 extends beyond the combined length of the smaller sized keys 2008. In the embodiment depicted in FIG. 20C, a number of the set of keys 2010 equal to the combined length of the smaller sized keys 2008 is less than three. In some embodiments, the number of the set of keys 2010 equal to the combined length of the smaller sized keys 2008 is at least two-and-a-half. In other embodiments, the number of the set of keys 2010 equal to the combined length of the smaller sized keys 2008 is at least three. In other words, in some embodiments there are at least two-and-a-half keys positioned directly above the arrow keys. In a further embodiment there are at least three full keys positioned directly above the arrow keys. And in a further embodiment there are more than three full keys positioned directly above the arrow keys. This layout configuration can be significant for relatively small sized keyboard layouts, where maximizing the size and/or position of frequently used keys can make a significant difference in the usability or ergonomics of the keyboard.

Left Side Keys

Figure 20D:
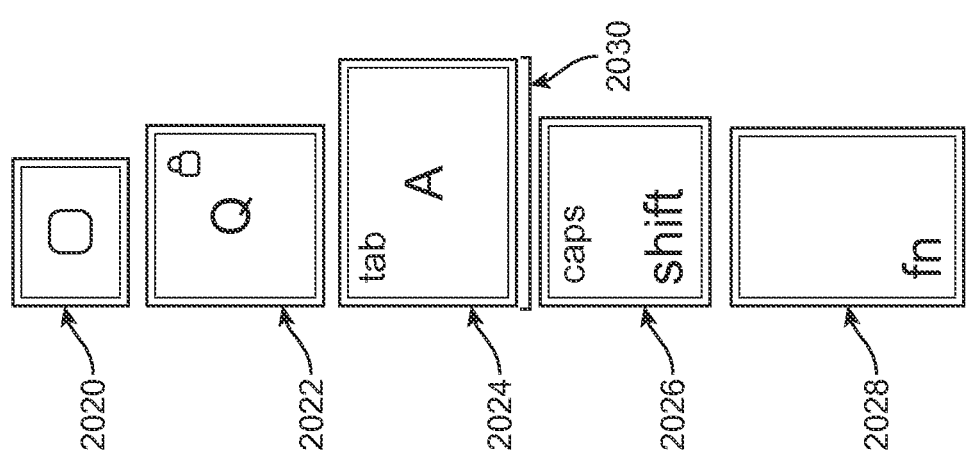
Figure 20E:
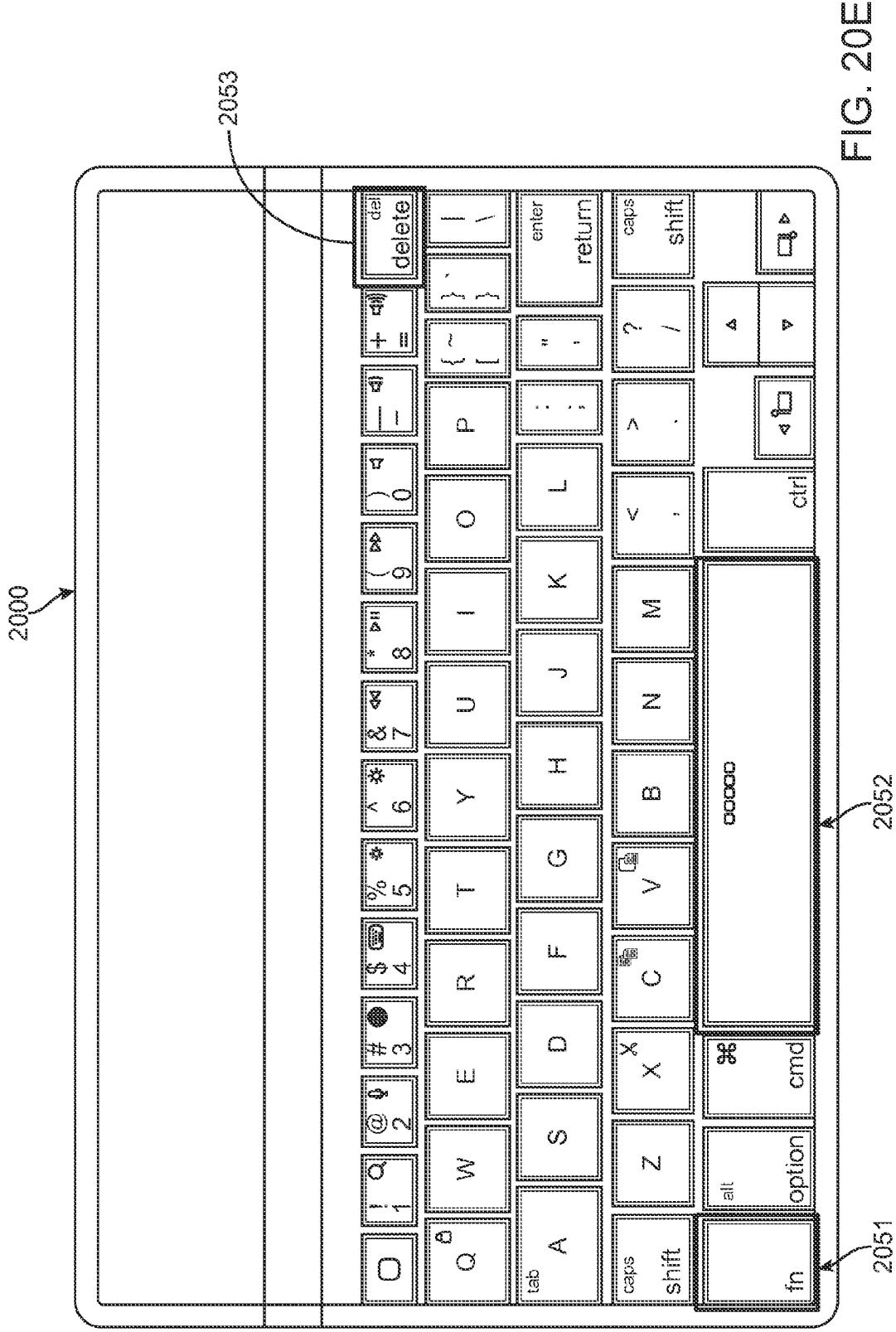
FIG. 20E depicts a top view of a keyboard configured to specify input sequences based on received keystrokes, according to an embodiment of the invention.

In some embodiments, the left side of the keyboard 2000 is configured with one or more alphanumeric character keys as the first keys on the second row and third row from the top of the keyboard 2050. FIG. 20D depicts a portion of the keyboard 2000 from FIG. 20A shown in isolation according to an embodiment of the invention. As depicted in FIG. 20D, the left side of the keyboard 2050 includes a "☐" (or "Home/Esc") key 2020, a "Q"/"lock" key 2022, an "A"/"tab" key 2024, a "shift"/"caps lock" key 2026, and the "fn" (or function) key 2028. In this embodiment, the functions of the "shift" key and "caps lock" key, which are typically separate keys, has been combined onto a single key 2026. Similarly, the keys representing the letters "A" and "Q" have been combined with keys typically reserved solely for function keys. The "A" key has been merged with the "tab" key on key 2024. The "Q" has been merged with the "lock" key on key 2022. As depicted in FIG. 20D, the relative positions of the merged alphabet keys 2022 and 2024 are generally the same as on typical keyboards, providing a consistency to a user. In some embodiments, the functions of keys 2020-2028 may be different than those depicted in FIG. 20D.

In some embodiments, key 2024 (the "A" key) may be elongated and have a larger length than the other 25 alphabet character keys. In FIG. 20D, the length of key 2024 is represented by line segment 2030. In such embodiments, key 2022 (the "Q" key) may have the same dimensions as all other alphabet keys on the keyboard 2000. In some embodiments, key 2022 may be the same dimensions as the other alphabet keys, and may be smaller than key 2024. Key 2026 may have a slightly larger width than the alphabet keys.

System Diagram

Figure 21:
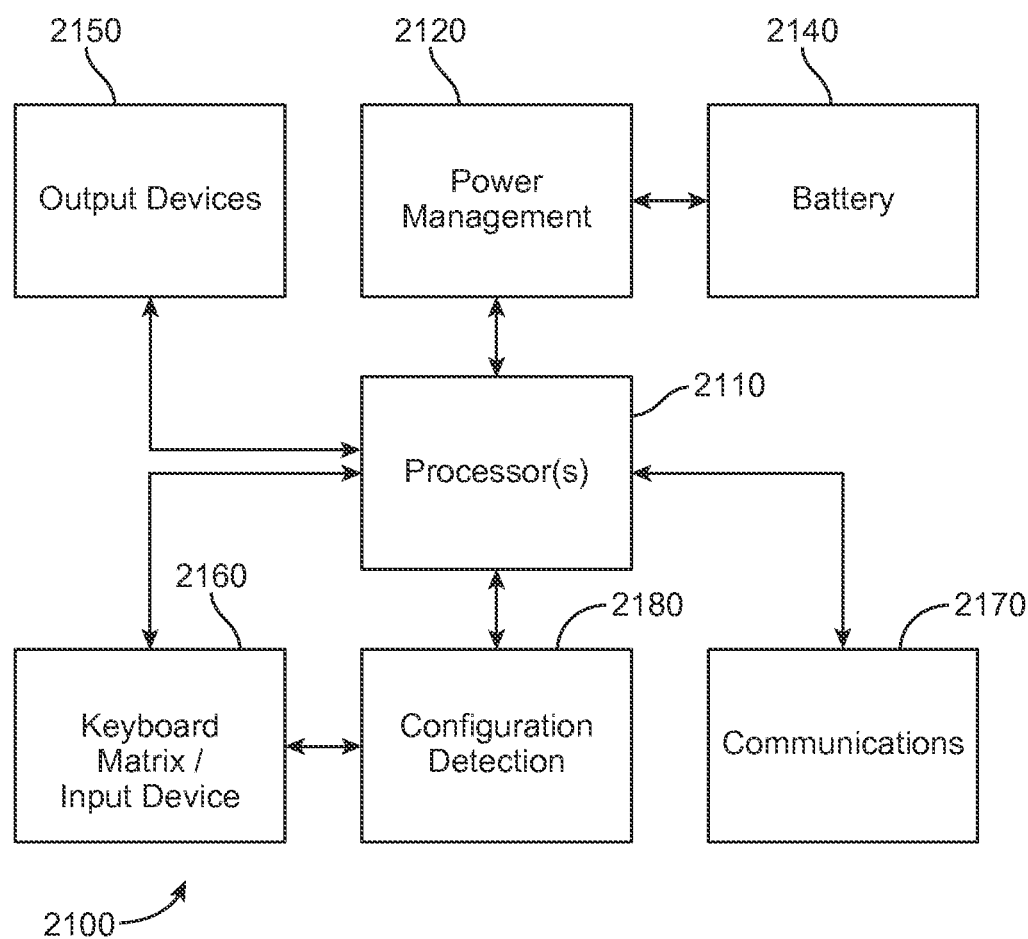
FIG. 21 is a simplified block diagram of an exemplary system 2100 configured to operate the various protective cover systems discussed herein, according to certain embodiments of the invention.

FIG. 21 is a simplified block diagram of an exemplary system 2100 configured to operate the various protective cover systems discussed herein, according to certain embodiments of the invention. The system 2100 includes a processor 2110, a power management system 2120, a power supply (e.g., batteries, rechargeable batteries, accumulator(s), renewable power sources (e.g., solar)) 2140, an output device 2150, a keyboard matrix 2160, a communications block 2170, and configuration detection system 2180. Each of the system blocks 2120-2170 can be in electrical communication with processor 2110. System 2100 may further include additional systems (e.g., audio systems, touch screen input/outputs, etc.) that are not shown or discussed to prevent obfuscation of the novel features described herein. Similarly, some systems 2100 may include fewer systems (e.g., no photovoltaic elements, no keyboard, etc.) as required by design.

In certain embodiments, processor 2110 comprises one or more microprocessors (μCs) and is configured to control the operation of system 2100. Alternatively, processor 2110 may include one or more microcontrollers (MCUs), digital signal processors (DSPs), or the like, with supporting hardware/firmware (e.g., memory, programmable I/Os, etc.), as would be appreciated by one of ordinary skill in the art. The processor 2110 can be configured to operate the protective cover systems (or more generally, an input device) described herein.

In certain embodiments, power management system 2120 of system 2100 is configured to manage power distribution, recharging, power efficiency, and the like. Power management system 2120 can control the power distribution by the batteries 2140 or other power sources (e.g., photovoltaic cells).

Communications system 2170 is configured to provide wireless communication between the various protective cover systems described herein and a mobile input device (e.g., tablet computer), according to an embodiment of the invention. Communications system 2170 can be controlled by processor 2110 and configured to provide radio-frequency (RF) communication with any of a wide variety of wireless communication protocols including, but not limited to, Bluetooth, WiFi and infra-red wireless systems. The various protective cover systems may optionally comprise a hardwired connection to their associated input devices. For example, system 2100 may provide a Universal Serial Bus (USB) cable to provide electronic communication to the attached input device or other external devices. Other embodiments of the invention may utilize different types of cables or connection protocol standards to effectuate a hardwired communication with outside entities. In one non-limiting example, a USB cable can be used to provide power to a protective cover to charge batteries 2140 and simultaneously support data communication between system 2100 and the input device.

In some embodiments, processor 2110 integrates processing and RF communication functions, in addition to scanning and controlling keyboard matrix 2160 and/or other input devices, monitoring configuration detection mechanisms 2180 (e.g., the relay switches, mechanical switches 1725, etc., used to detect keyboard modes, media button modes, closed configurations, etc.), controlling LEDs (not shown) and the like. Keyboard matrix 2160 can include a mechanical keyboard disposed in the protective cover. User inputs to the keyboard matrix can be wirelessly coupled to the tablet computer by way of processor 2110 and communication system 2170. Keyboard 2160 can include a key frame disposed therein (not shown) including a means of configuration detection. For example, relay switches (not shown) can be activated by a protective cover frame to determine when the keyboard is configured in the various operations modes of operation, as further described below. Alternatively, keyboard matrix 2160 may be configured in a non-conventional format (e.g., number pad, application-specific key arrangements, or other grouping of a number of buttons). The individual keys may be mechanical (e.g., scissor keys, plunger keys, etc.), soft keys on a display, or other suitable type of input interface.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

It is to be understood that the examples and embodiments described above are for illustrative purposes only and that various modifications or changes in light thereof will be suggested to persons skilled in the art and are to be included within the spirit and purview of this application and scope of the appended claims. Therefore, the above description should not be understood as limiting the scope of the invention as defined by the claims.

What is claimed is:

1. A protective cover for an input device having a display, the protective cover comprising:
   a housing including a top side and a bottom side, the bottom side to rest on a work surface, the housing further including a front portion, a middle portion, and a back portion;
   a plurality of keys disposed in the front portion of the top side of the housing;
   a latch mechanism hingeably coupled to the back portion of the housing, the latch mechanism to couple to and secure the input device in a configuration such that the display of the input device is flush with the top side of the housing; and
   a slot having a single entirely planar base, the slot fixedly disposed in the middle portion of the top side of the housing such that the slot does not move relative to the housing, and the slot to solely support the input device in a plurality of upright configurations including:
   a forward-facing upright configuration such that the input device leans toward the back portion of the housing and the display faces the front portion of the housing; and
   a backward-facing upright configuration such that the input device leans toward the front portion of the housing and the display faces the back portion of the housing.

2. The protective cover of claim 1 wherein a portion of the slot is overmolded with a rubber compound to provide an improved coefficient of friction to reduce lateral slippage of the input device when held in the slot.

3. The protective cover of claim 2 wherein the housing includes a surface, and wherein the overmolded portion protrudes above the surface of the housing to contact a surface of the input device when the surface of the input device is opposite and adjacent to the surface of the housing.

4. The protective cover of claim 2 wherein the rubber compound is a silicon-based rubber compound.

5. The protective cover of claim 1 wherein the input device is a tablet computer.

6. The protective cover of claim 1 wherein the forward facing upright configuration is at a first angle, wherein the backward facing upright configuration is at a second angle, and wherein the first angle is different from the second angle.

7. The protective cover of claim 1 wherein the slot is molded and comprised of an extruded aluminum structure with a co-molded silicon rubber disposed thereon.

8. The protective cover of claim 1 wherein the slot is configured to hold the input device in two or more forward-facing upright configurations or two or more backward-facing upright configurations.

9. The protective cover of claim 1 wherein the slot includes one or more magnets disposed in or around the slot, the magnets to improve a hold strength of the slot when the input device is in one of the plurality of upright configurations.

10. An apparatus comprising:
a housing including a top side and a bottom side, wherein the bottom side is configured to rest on a work surface, the housing further including a front portion and a back portion; and
a slot having a single entirely planar base, the slot fixedly disposed in the back portion of the top side of the housing such that the slot does not move relative to the housing, the slot to solely support an input device with a display in a plurality of upright configurations including:
a forward-facing upright configuration such that the input device leans toward the back portion of the housing and the display faces the front portion of the housing; and
a backward-facing upright configuration such that the input device leans toward the front portion of the housing and the display faces the back portion of the housing.

11. The apparatus of claim 10 wherein a portion of the slot is overmolded with a rubber compound to provide an improved coefficient of friction and reduce slippage of the input device when held in the slot.

12. The apparatus of claim 11 wherein the housing includes a surface, and wherein the overmolded portion protrudes above the surface of the housing to contact a surface of the input device when the surface of the input device is configured to be opposite and adjacent to the surface of the housing.

13. The apparatus of claim 10 wherein the rubber compound is a silicon-based rubber compound.

14. The apparatus of claim 10 wherein the input device is a tablet computer.

15. The apparatus of claim 10 wherein the slot holds the input device at a 65 degree angle with respect to the back portion of the housing when configured in the backward-facing upright configuration.

16. The apparatus of claim 10 wherein the slot holds the input device at a 72 degree angle with respect to the front portion of the housing when configured in the forward-facing upright configuration.

17. The apparatus of claim 10 wherein the slot is molded and comprised of an extruded aluminum structure with a co-molded silicon rubber disposed thereon.

18. The apparatus of claim 10 further comprising one or more magnets disposed in or around the slot, the one or more magnets to provide a magnetic force to increase a retention strength of the slot, the retention strength being related to an amount of force required to budge or remove the input device from the slot when the input device is in one of the plurality of upright configurations.

19. The apparatus of claim 18 wherein the magnets provide a magnetic force of a magnitude such that the retention strength of the slot is greater than a combined weight of the apparatus and the input device.

20. The apparatus of claim 19 wherein the retention strength of the slot is reduced when the input device is laterally moved along the slot from the one or more upright configurations or the input device is moved a threshold angle from the one of the plurality of upright configurations.

21. A protective cover for an input device having a display, the protective cover comprising:
a housing including a top side and a bottom side, the bottom side to rest on a work surface, the housing further including a front portion, a middle portion, and a back portion;
a latch mechanism hingeably coupled to the back portion of the housing, the latch mechanism to couple to and secure the input device in a configuration such that the display of the input device is flush with the top side of the housing; and
a slot having a single entirely planar base, the slot fixedly disposed in the back portion of the top side of the housing such that the slot does not move relative to the housing, the slot to solely support the input device in a plurality of upright configurations, the slot including:
a first set of features forming a first portion of the slot to secure the input device in an upright and forward-facing configuration such that the input device leans toward the back portion of the housing and the display faces the front portion of the housing; and
a second set of features forming a second portion of the slot to secure the input device in an upright and backward-facing configuration such that the input device leans toward the front portion of the housing and the display faces the back portion of the housing.

22. The protective cover of claim 21 wherein a portion of the slot is overmolded with a rubber compound to provide an improved coefficient of friction in the slot.

23. The protective cover of claim 21 further comprising one or more magnets disposed in or around the slot, the one or more magnets to provide a magnetic force operable to increase a retention strength of the slot, the retention strength being related to an amount of force required to budge or remove the input device from the slot when the input device is in one of the plurality of upright configurations.

24. The protective cover of claim 23 wherein the magnets provide a magnetic force of a magnitude such that the retention strength of the slot is greater than a combined weight of the apparatus and the input device.

25. The protective cover of claim 24 wherein the retention strength of the slot is reduced when the input device is laterally moved along the slot from the one or more upright configurations or the input device is moved a threshold angle from the one of the plurality of upright configurations.

* * * * *